US011417111B2

(12) United States Patent
Aceti et al.

(10) Patent No.: US 11,417,111 B2
(45) Date of Patent: Aug. 16, 2022

(54) METHOD, SYSTEM AND MATERIAL FOR DETECTING OBJECTS OF HIGH INTEREST WITH LASER SCANNING SYSTEMS

(71) Applicant: Terra Scientia, LLC, Palm Beach, FL (US)

(72) Inventors: John G. Aceti, New Hope, PA (US); Jonathan Bernstein, Palm Beach Garden, FL (US); Dennis Garrison, Bournemouth (GB)

(73) Assignee: TERRA SCIENTIA, LLC, Palm Beach Gardens, FL (US)

( * ) Notice: Subject to any disclaimer, the term of this patent is extended or adjusted under 35 U.S.C. 154(b) by 788 days.

(21) Appl. No.: 16/228,389

(22) Filed: Dec. 20, 2018

(65) Prior Publication Data
US 2019/0196020 A1   Jun. 27, 2019

Related U.S. Application Data

(60) Provisional application No. 62/702,407, filed on Jul. 24, 2018, provisional application No. 62/609,502, filed on Dec. 22, 2017.

(51) Int. Cl.
*G06V 20/58* (2022.01)
*G08G 1/04* (2006.01)
(Continued)

(52) U.S. Cl.
CPC ............ *G06V 20/58* (2022.01); *G01S 17/003* (2013.01); *G01S 17/04* (2020.01); *G01S 17/93* (2013.01);
(Continued)

(58) Field of Classification Search
CPC ........ G01S 17/003; G01S 17/42; G01S 17/93; G01S 7/4802; G01S 7/4815; G01S 17/04;
(Continued)

(56) References Cited

U.S. PATENT DOCUMENTS

| 4,796,198 A | 1/1989 | Boultinghouse et al. |
| 5,241,481 A | 8/1993 | Olsen |

(Continued)

FOREIGN PATENT DOCUMENTS

| CN | 105445745 A | 3/2016 |
| CN | 105807290 A | 7/2016 |

(Continued)

OTHER PUBLICATIONS

ASTM International, "Standard Specification for Retroreflective Sheeting for Traffic Control1", D 4956-04, Reproduction authorized per License Agreement with 3M; Thu Oct. 21, 2004, 12 pages.
(Continued)

*Primary Examiner* — Yuqing Xiao
*Assistant Examiner* — Amir J Askarian
(74) *Attorney, Agent, or Firm* — The Marbury Law Group, PLLC

(57) ABSTRACT

Various embodiments include methods and scanning systems for photonically detecting an object of high-interest having selective wavelength reflection. Various embodiments include sequentially scanning the environment by projecting a coherent pulsed electromagnetic beam of light of a first wavelength. Reflected light of the first coherent beam is received onto a photoelectric detector, which outputs digital intensity data. Various embodiments further include sequentially scanning the environment by projecting a coherent pulsed electromagnetic beam of light of a second wavelength different from the first wavelength. Reflected light of the second coherent beam is received onto a photoelectric detector, which outputs digital intensity data. The intensity of the reflected light of the first wavelength may be compared with the intensity reflected light of the second wavelength, and an alert may be sent to an autonomous
(Continued)

vehicle system in response to the intensity difference exceeding a threshold.

26 Claims, 16 Drawing Sheets

(51) Int. Cl.
| | |
|---|---|
| *G01S 17/93* | (2020.01) |
| *G01S 17/00* | (2020.01) |
| *G01S 17/04* | (2020.01) |
| *G06V 10/143* | (2022.01) |
| *G06V 10/20* | (2022.01) |

(52) U.S. Cl.
CPC .......... *G06V 10/143* (2022.01); *G06V 10/255* (2022.01); *G08G 1/04* (2013.01)

(58) Field of Classification Search
CPC .......... G01S 17/74; G01S 17/87; G01S 17/89; G01S 17/931; G01S 7/4817; G01S 7/484; G01S 17/10; G01S 17/26; G01S 17/58; G01S 17/86; G01S 17/88; G01S 17/894; G01S 7/026; G01S 7/4808; G01S 7/481; G01S 7/4811; G01S 7/4816; G01S 7/4863; G01S 7/4865; G01S 7/4873; G01S 7/497; G01S 7/499; G06K 9/00805; G06K 9/2018; G06K 9/3241; G06K 19/06084; G06K 19/0614; G06K 2209/15; G06K 7/12; G06K 9/00791; G06K 9/00798; G06K 9/00818; G06K 9/2027; G06K 9/4661; G06K 9/6202; G06K 9/6267; G06K 9/6273; G06K 9/6293; G08G 1/04

See application file for complete search history.

(56) References Cited

U.S. PATENT DOCUMENTS

| | | | |
|---|---|---|---|
| 5,249,157 A | 9/1993 | Taylor | |
| 5,467,273 A | 11/1995 | Faibish et al. | |
| 5,793,034 A | 8/1998 | Wesolowicz et al. | |
| 6,069,558 A | 5/2000 | Kershaw | |
| 6,608,321 B1 | 8/2003 | La Fontaine et al. | |
| 7,714,888 B2 | 5/2010 | Zanzucchi et al. | |
| 7,847,235 B2 | 12/2010 | Krupkin et al. | |
| 8,194,927 B2* | 6/2012 | Zhang ................ | G06K 9/00798 |
| | | | 382/104 |
| 8,692,980 B2 | 4/2014 | Gilliland et al. | |
| 9,056,395 B1 | 6/2015 | Ferguson et al. | |
| 9,103,663 B2* | 8/2015 | Min ..................... | G01B 11/22 |
| 9,235,988 B2 | 1/2016 | Mimeault et al. | |
| 9,360,554 B2* | 6/2016 | Retterath ............ | G01S 17/42 |
| 9,377,533 B2 | 6/2016 | Smits | |
| 9,378,640 B2 | 6/2016 | Mimeault et al. | |
| 9,753,126 B2 | 9/2017 | Smits | |
| 2002/0105581 A1* | 8/2002 | Masaki .............. | H04N 5/23241 |
| | | | 348/229.1 |
| 2007/0097295 A1 | 5/2007 | Hebrank et al. | |
| 2008/0051953 A1 | 2/2008 | Jones et al. | |
| 2010/0246967 A1* | 9/2010 | Ando .................. | H04N 5/3572 |
| | | | 382/190 |
| 2011/0228089 A1 | 9/2011 | Almeida | |
| 2013/0204518 A1 | 8/2013 | Melville | |
| 2014/0232566 A1 | 8/2014 | Mimeault et al. | |
| 2014/0268098 A1 | 9/2014 | Schwarz et al. | |
| 2015/0019098 A1 | 1/2015 | Schräbler et al. | |
| 2015/0279250 A1 | 10/2015 | McDaniel | |
| 2015/0293228 A1* | 10/2015 | Retterath ............ | G01S 17/931 |
| | | | 356/5.01 |
| 2016/0146926 A1 | 5/2016 | Jungwirth | |
| 2016/0349754 A1 | 12/2016 | Mohr et al. | |
| 2016/0370263 A1 | 12/2016 | Duesterhoft et al. | |
| 2017/0234976 A1* | 8/2017 | Grauer ................ | G01S 17/89 |
| | | | 356/5.04 |
| 2017/0372607 A1 | 12/2017 | Janovec et al. | |

FOREIGN PATENT DOCUMENTS

| | | |
|---|---|---|
| EP | 0479273 B1 | 6/2000 |
| EP | 2703837 B1 | 3/2014 |
| EP | 2703837 B1 | 7/2017 |
| JP | 3982959 B2 | 7/2007 |
| KR | 20160045770 A | 4/2016 |
| WO | 2015013240 A1 | 1/2015 |
| WO | 2017/143217 A1 | 8/2017 |

OTHER PUBLICATIONS

International Search Report and Written Opinion of the International Searching Authority, for International Application No. PCT/US2018/067085, dated Apr. 18, 2019.
International Preliminary Report of Patentability for International Application No. PCT/US2018/067085 dated Jul. 2, 2020, 11 pages.
James Snyder et al., "Invisible 2D Bar Code to Enable Machine Readability of Road Signs—Material and Software Solutions", 3M Transportation Safety Division, St. Paul, MN, 2018, 8 pages.
"Manual on Uniform Traffic Control Devices for Streets and Highways" 2009 Edition, U.S. Department of Transportation, Federal Highway Administration, Dec. 2009, 862 pages.
"ANSI/ISEA 107-2015 Made Easier", Standard Update #34, 3M Science Applied to Life, Personal Safety Division, Jun. 21, 2016, 7 pages, www.safetyequipment.org.
ANSI/ISEA's Feb. 2016 High Visibility Clothing standard update "ANSI/ISEA 107-2015 High-Visibility Saftery Apparel and Accessories Standard Update" Apr. 5, 2016, No. 072/16, 3 pages.
"ANSI/ISEA 207-2006" "American National Standard for High Visibility Public Safety Vest", standards for workers on the road or for fire, police and medical personnel, OSHA Trade New Release, US Department of Labor, Oct. 2009, 11 pages.
Extended European Search Report received in related Application No. 18893218.0-1206 / 3729128 PCT/US2018/067085 dated Aug. 11, 2021.

\* cited by examiner

METHOD, SYSTEM AND MATERIAL FOR DETECTING OBJECTS OF HIGH INTEREST WITH LASER SCANNING SYSTEMS

RELATED APPLICATIONS

This application claims the benefit of priority to U.S. Provisional Patent Application No. 62/609,502 entitled "METHOD, SYSTEM AND MATERIAL FOR DETECTING OBJECTS OF HIGH INTEREST WITH LASER SCANNING SYSTEMS" filed Dec. 22, 2017, and to U.S. Provisional Patent Application No. 62/702,407 entitled "SYSTEM FOR ENHANCED SAFETY OF MOBILE VEHICLES" filed Jul. 24, 2018, the entire contents of both of which are incorporated herein by reference.

BACKGROUND

Laser scanning systems are being used to help navigate complex environments. Whether the environment is the human body, a household vacuuming robot, or city streets, these laser scanning systems have the unique ability to collect complex information from the environment. In conjunction with a computer processor and advanced algorithms, the system can detect and define physical structures, shape of objects, velocity of moving objects, and provide navigational path recommendations. What they cannot do readily is identify specific objects of interest that either lack a highly specific shape or some differentiable feature. It is therefore advantageous that these systems have another means of identifying objects of high interest that lack either of these attributes.

SUMMARY

Disclosed herein is a method, and laser scanning system implementing the method, for detecting objects of high interest in the path, or environment, of a laser scanning system.

Various embodiments may include methods of photonically detecting an object of high-interest having selective wavelength reflection in a scanned volume. Various embodiments may include projecting coherent light of a first wavelength, receiving reflected light of the first wavelength on a photoelectric detector and outputting a digital measure of intensity of the reflected light of the first wavelength, projecting coherent light of a second wavelength different from the first wavelength, receiving reflected light of the second wavelength on the photoelectric detector and outputting a digital measure of intensity of the reflected light of the second wavelength, determining whether a difference between the intensity of reflected light of the first wavelength and the intensity of reflected light of the second wavelength exceeds a threshold, and sending an alert to a control system in response to determining that the difference between the intensity of reflected light of the first wavelength with the intensity of reflected light of the second wavelength exceeds the threshold. In some embodiments, the coherent light of the second wavelength is infrared (IR) light equal to or larger than 1100 nm and the coherent light of the first wavelength is smaller than 1100 nm.

In some embodiments, determining whether a difference between the intensity of reflected light of the first wavelength and the intensity of reflected light of the second wavelength exceeds a threshold may include detecting an IR-only retroreflector when the difference between the intensity of reflected light of the first wavelength and the intensity of reflected light of the second wavelength from a same location within in the scanned volume exceeds the threshold.

In some embodiments, projecting coherent light of the first wavelength may include projecting pulses of a first beam of coherent light of the first wavelength, projecting pulsed coherent light of the second wavelength may include projecting pulses of a second beam of coherent light of the second wavelength between pulses of the first beam and spatially coincident with the first beam. Such embodiments may further include determining a location within the scanned volume based upon a rotational angle and azimuth of the first and second beams at which the difference between the intensity of reflected light of the first wavelength and the intensity of reflected light of the second wavelength exceeds the threshold.

In some embodiments, receiving reflected light of the first and second wavelength on the photoelectric detector and outputting digital measures of intensity of the reflected light of the first and second wavelengths each comprise receiving reflected light on a pixel array of photoelectric detectors. Such embodiments may further include determining a location of an IR-only retroreflector within the scanned volume based upon locations of pixels within the pixel array at which the difference between the intensity of reflected light of the first wavelength and the intensity of reflected light of the second wavelength exceeds the threshold. Some embodiments may further include detecting a barcode or QR code constructed of IR-only retroreflectors located within the scanned volume.

In some embodiments, sending an alert to a vehicle navigation system in response to determining that the difference between the intensity of reflected light of the first wavelength and the intensity of reflected light of the second wavelength exceeds the threshold may include informing the vehicle navigation system of detection of an IR-only retroreflector.

Some embodiments may further include determining whether multiple spatially contiguous detections of intensity differences exceeding the threshold are made, wherein sending an alert to the vehicle navigation system may include sending the alert to the vehicle system navigation in response to determining that multiple spatially contiguous detections of intensity differences exceeding the threshold are made.

Some embodiments may further include summing a number of spatially contiguous detections of intensity differences exceeding the threshold, and sending an alert to the autonomous vehicle system in response to the number of spatially contiguous alerts exceeding a threshold value.

Some embodiments may further include summing a number of repeated temporal detections of an object for which the difference between the intensity of reflected light of the first wavelength and the intensity of reflected light of the second wavelength exceeds the threshold.

Some embodiments may further include determining whether a geometric shape of a detection matches a geometric shape stored in a database.

Some embodiments include a laser scanning system for use in a vehicle, that may include a first laser configured to emit coherent light of a first wavelength, a second laser configured to emit coherent light of a second wavelength different from the first wavelength, a photoelectric detector configured to determine an intensity of reflected light, and a computing device coupled to the laser sources and photoelectric detector. The computing device may be configured with processor-executable instructions to perform operations including causing the first laser to project light of the first wavelength and receiving a measure of intensity of reflected light of the first wavelength from the photodetector, causing the second laser to project light of the second wavelength and receiving a measure of intensity of reflected light of the second wavelength from the photodetector, determining whether a difference between the intensity of reflected light of the first wavelength and the intensity of reflected light of the second wavelength exceeds a threshold, and sending an alert to an autonomous vehicle system in response to determining that the difference between the intensity of reflected light of the first wavelength with the intensity of reflected light of the second wavelength exceeds the threshold. In some embodiments, the coherent light of the second wavelength is infrared (IR) light equal to or larger than 1100 nm and the coherent light of the first wavelength is smaller than 1100 nm.

In some embodiments, the computing device may be configured with processor-executable instructions to perform operations such that determining whether a difference between the intensity of reflected light of the first wavelength and the intensity of reflected light of the second wavelength exceeds a threshold may include detecting an IR-only retroreflector when the difference between the intensity of reflected light of the first wavelength and the intensity of reflected light of the second wavelength from a same location within in the scanned volume exceeds the threshold.

In some embodiments the laser scanning system may further include a laser positioning system coupled to the first and second laser and the computing device and configured to orient the first and second laser to rotation angle and azimuth coordinates and convey the rotation angle and azimuth coordinates to the computing device, in which the first laser is configured to emit a first beam of coherent light of the first wavelength, the second laser is configured to emit a second beam of coherent light of the second wavelength that is spatially coincident with the first beam. In such embodiments, the computing device may be configured with processor-executable instructions to perform operations that determine a location of an IR-only retroreflector within the scanned volume based upon a rotational angle and azimuth of the first and second beams at which the difference between the intensity of reflected light of the first wavelength and the intensity of reflected light of the second wavelength exceeds the threshold.

In some embodiments, the photoelectric detector may include a pixel array of photoelectric detectors, and the computing device may be configured with processor-executable instructions to perform operations further including determining a location of an IR-only retroreflector within the scanned volume based upon locations of pixels within the pixel array at which the difference between the intensity of reflected light of the first wavelength and the intensity of reflected light of the second wavelength exceeds the threshold. In such embodiments, the computing device may be configured with processor-executable instructions to perform operations further including detecting a barcode or QR code constructed of IR-only retroreflectors located within the scanned volume.

In some embodiments, the computing device may be configured with processor-executable instructions to perform operations such that sending an alert to a vehicle navigation system in response to determining that the difference between the intensity of reflected light of the first wavelength with the intensity of reflected light of the second wavelength exceeds the threshold may include informing the vehicle navigation system of detection of an IR-only retroreflector.

In some embodiments, the computing device may be configured with processor-executable instructions to perform operations further including determining whether multiple spatially contiguous detections of intensity differences exceeding the threshold are made. In such embodiments, the computing device may be configured with processor-executable instructions to perform operations such that sending an alert to the vehicle navigation system may include sending the alert to the vehicle system navigation in response to determining that multiple spatially contiguous detections of intensity differences exceeding the threshold are made. In such embodiments, the computing device may be configured with processor-executable instructions to perform operations further including summing a number of spatially contiguous detections of intensity differences exceeding the threshold and sending an alert to the autonomous vehicle system in response to the number of spatially contiguous alerts exceeding a threshold value.

In some embodiments, the computing device may be configured with processor-executable instructions to perform operations further including summing a number of repeated temporal detections of an object for which the difference between the intensity of reflected light of the first wavelength with the intensity of reflected light of the second wavelength exceeds the threshold.

In some embodiments, the computing device may be configured with processor-executable instructions to perform operations further including determining whether a geometric shape of a detection matches a geometric shape stored in a database.

Some embodiments may include an infrared (IR)-only device for use in tagging objects for recognition by laser scanning systems. Such IR-only devices may include a first substrate, a reflector positioned in the first substrate and having characteristics of a retroreflector, the reflector comprising a refractive component having transmissive optical properties for light with a wavelength larger than 1100 nm and absorption or scattering properties for light with a wavelength smaller than 1100 nm, and a second substrate configured to be appended to, or made part of, an object. In some embodiments, the object may be a roadway sign.

Various embodiments may include methods of photonically detecting an object of high-interest in a scanned volume. Such embodiments may include sequentially scanning the environment by projecting a coherent electromagnetic radiation beam, receiving a reflected wave of the beam onto a photoelectric detector, converting the analog output of the photoelectric detector into digital data, recording each sequential projected beam's angle and azimuth relative to a baseline, storing in memory the sequential digital data with its associated angle and azimuth, identifying any digital data representing a saturated condition, identifying presence of multiple contiguous digital data having a saturated condition, and sending an alert if one or more sets of contiguous saturated conditions exceed a pre-determined number of contiguous digital data having a saturated condition. Such embodiments may further include determining if multiple contiguous saturated amplitudes have an essential geometric shape using an image processing algorithm.

Some embodiments may include a laser scanning system that includes a laser source, a photoelectric detector, a memory, and a processor coupled to the laser emitter, photoelectric detector, and memory. In such embodiments, the processor is configured with processor-executable instructions to perform operations including sequentially scanning the environment by causing the laser source to project a coherent electromagnetic radiation beam, receiving data from the photoelectric detector receiving reflected waves of the beam, converting the analog output of the photoelectric detector into digital data, recording each sequential projected beam's angle and azimuth relative to a baseline, storing in the memory the sequential digital data with its associated angle and azimuth, identifying any digital data representing a saturated condition, identifying presence of multiple contiguous digital data having a saturated condition, and sending an alert if one or more sets of contiguous saturated conditions exceed a pre-determined number of contiguous digital data having a saturated condition. In such embodiments, the processor may be configured with processor-executable instructions to perform operations further including determining if multiple contiguous saturated amplitudes have an essential geometric shape using an image processing algorithm.

Further embodiments may include means for performing functions of any of the methods summarized above.

The system of various embodiments may be used in combination with, or integrated into, currently anticipated autonomous vehicle (AV) navigation systems, including but not limited to: LIDAR, LIDAR-Camera, Flash LIDAR, or Camera-Camera navigation systems. Various embodiments may be used with any system using an infrared (IR) illumination source for interrogating the AV's environment. As AVs should navigate by day and night, an illumination source is needed; IR illumination is invisible to the human eye and eye safe when designed properly.

Various embodiments include a taggant that is highly unique in roadside environments such that its detection indicates that a state of heightened diligence by the AV's navigation system is appropriate. The typical environment is filled with complex objects that are identified by size, color, motion, distance-to-vehicle, geometry and relative reflectivity. Retroreflectors help to identify objects of import, such as signs, emergency vehicles, roadway guides, roadside workman and large commercial vehicles. The relatively high reflectivity of these objects not only directs human attention, but can also be used by machine vision system with appropriate sensors and processing capability. AV navigation systems may continually process this information giving priority to objects of high relative reflectivity, and or high relative reflectivity and unique geometry, such as squares, triangles, or octagons. Various embodiments include methods and systems for enhancing the uniqueness of these objects, making them more readily detectable by machine vision and providing faster means of isolating objects of threat or requiring special navigation attention.

Various embodiments include the use of IR-only retroreflectors on roadways. While IR-only retroreflectors are used in specialty applications, they are not associated with AVs on traditional roadways principally because they only reflect IR radiation, which cannot be detected by a human. Given the hundreds to thousands of objects that may be detected by an AV, traditional retroreflectors limit the number of detected objects to tens to hundreds. However, many retroreflectors positioned on low threat/priority objects create noise and tend to overload the AV navigation system's processing. With IR-only retroreflectors tagging objects of high import, such as school buses, roadway signs, emergency vehicles or roadside workman, the number of detected objects expectantly drops to single digits. Fewer objects of known importance speeds processing and allows the navigation system to respond more quickly, making the identification process by the AV's navigation processor faster and more precise. With its unique optical properties, an IR-only retroreflector provides a true beacon of alert for AV vehicles.

Various embodiments include processing methods used in conjunction with sensing systems and IR-only taggant that can be used to minimize false detection of taggants. Faster more precise detection of threats and priority objects helps an AV respond faster. This helps current AVs in two ways. Faster response helps the AV travel faster, which is a limitation of current AVs. Secondly, faster detection provides more time to process data to determine whether evasive action needs to be taken both avoiding unnecessary breaking or sudden hard breaking. Various embodiments include an algorithm to minimize false alerts.

Various embodiments include a threat detection system which minimizes physical threat to the vehicle, or a physical threat to an object by the vehicle, such as a pedestrian, or a threat of violating a law or regulation, or a threat of violating commonly understood codes of roadway courtesy.

BRIEF DESCRIPTION OF THE DRAWINGS

The accompanying drawings, which are incorporated herein and constitute part of this specification, illustrate example aspects of various embodiments, and together with the general description given above and the detailed description given below, serve to explain the features of the claims.

DETAILED DESCRIPTION

Figure 1:
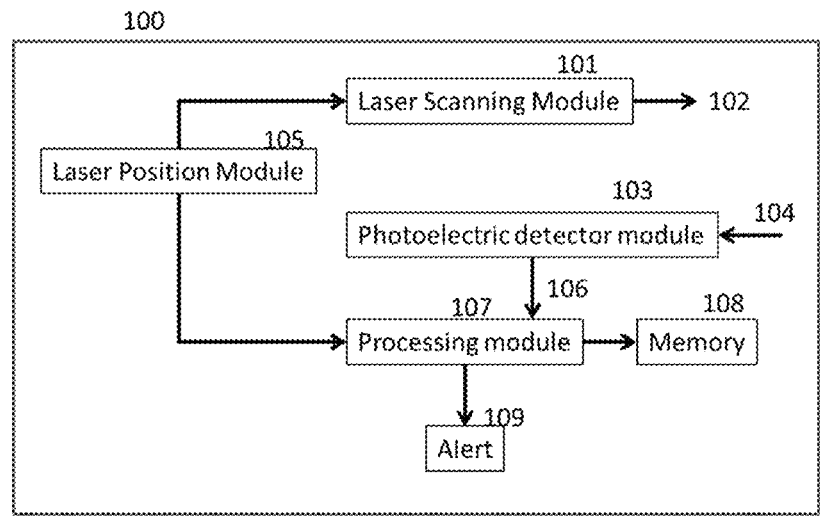
FIG. 1 is a schematic block diagram of a system for photonically detecting an object of high-interest in a scanned volume, in accordance with various embodiments.

Various embodiments improve the detection of existing retroreflectors, such as in the form of detecting objects of import, without the need for the IR-only retroreflectors. In addition, various embodiments improve contemporary road signs by using dual wavelengths to detect retroreflectors, rather than a single wavelength. The use of dual wavelengths provides far less noise and is therefore a more sensitive and reliable system of detection. In the context of laser scanning systems, such as those using IR-only retroreflectors, providing this type of redundancy is advantageous and may comparatively detect objects of import at a greater distance. Such systems, in the context of navigation, may eliminate unnecessary braking and/or provide more gradual breaking when needed.

Various embodiments may be applied to a broad range of safety and communication systems and components, such as signs, tags, IR-only QR codes, and more. Due to the highly specific and sensitive nature of IR-only retroreflectors, various embodiments provide enhanced specificity and added redundancy, which is beneficial for safety systems. Various embodiments provide more rapid detection, which in the context of AVs may provide added safety and a more comfortable ride.

Some embodiments may be best illustrated by the situation of a semi-autonomous or fully autonomous vehicle approaching a school bus. School buses often operate in low-visibility conditions, such as early morning, or in poor weather, or in rural areas where artificial lighting may be poor. While their yellow color may give them conspicuity during the day, darkness, fog, or haze may render them difficult to detect by machine vision. To improve their visibility, many authorities require the use of retroreflective tape on school buses, making the vehicle easier to detect. The various embodiments enable detecting the presence of that retroreflecting stripe and provide an alert to a vehicle's control system. The detection of the retroreflector provides an alert to the system that an object of import is near and appropriate actions may be required.

In the case of a school bus, certain laws demand that the vehicle may not pass the bus as it may do so with other vehicles on the road. The detection of the retroreflector on the school bus should be detected and cause the control system to use other means, such as a camera, to further identify the object of import. Today's LIDAR system does not identify objects, it is designed to only determine the size, distance and trajectory of objects around the vehicle. The means by which a LIDAR system can detect a retroreflector in a vehicle's environment is further described herein.

In some embodiments, an existing LIDAR system may be used, and in other embodiments, a dedicated scanning laser-detector system may be used. Most semi-autonomous and autonomous vehicles being developed for commercial applications use LIDAR systems and various embodiments herein may be incorporated into such systems. On vehicles not currently using a LIDAR system, a simpler laser scanning and detection system may be used. Railway systems do not currently use LIDAR, but by incorporating a laser-scanning and retroreflector detection system into the front locomotive, fatal accidents involving workers on the tracks wearing retroreflective vests may be avoided. Some embodiments may be utilized for any moving vehicle to avoid objects tagged with retroreflective material.

One other means of identifying objects of specific interest but variable shape is by combining LIDAR with a means of capturing visible imagery. Cameras, in communication with advanced image processing tools can be programmed to identify objects of specific interest. For example, a self-driving car will combine a laser scanning system with a visible camera to detect a school bus by its shape, color and features. The school bus is an object of specific interest because the navigation rules about the bus are defined by laws that may be different than that which would be applied to navigation about an ordinary bus.

Another means of identifying objects of specific interest is to tag the object. For example, a laser scanning system to detect cancer cells in vivo may use a color camera to detect the unique fluorescent signature of cells when illuminated by UV electromagnetic radiation. However, many other types of cells fluoresce so there is a need to tag the cancer cells to uniquely identify them. A color camera in combination with a scanning laser may be used. It would be simpler and less expensive if the scanning laser itself could identify these unique cells. By way of example, a laser scanning system for navigating self-driving vehicles is receiving great attention and will be used here to further clarify problems in such systems and to illustrate the usefulness of various embodiments.

The use of a self-driving vehicle as an illustration of the problem and an illustration of the capacity of various embodiments is not intended to limit the disclosure or the claims.

Self-driving vehicles are progressing in sophistication and safety with semi-autonomous vehicles already on the road and fully autonomous vehicles in various stages of prototyping. These vehicles use various technologies, both singularly and in combination, to provide a means by which their control system may sense the environment, have a predetermined drive path, and navigate the vehicle through the ever changing and challenging environment. The effort to launch these vehicles commercially is relentlessly advancing.

Levels of vehicle automation are envisioned and being developed by the various automotive companies around the world. The International Society of Automotive Engineers has defined six levels which are detailed in their guideline; Levels of Driving Automation for On-Road Vehicle. This guideline defines levels from no automation to full automation with four intermediate levels. Today, Level 2 systems are on the road. Lexus® (Nagoya, Japan) uses a "hands-off" automated system that takes full control of the vehicle (accelerating, braking, and steering). At this level the driver must monitor the driving and be prepared to immediately intervene at any time if the automated system fails to respond properly. The shorthand "hands off" is not meant to be taken literally. In fact, contact between hand and wheel is often mandatory during SAE 2 driving, to confirm that the driver is ready to intervene.

In 2017, Audi® (Ingolstadt, Germany) announced being the first Level 3 ("eyes off") commercial vehicle with its Audi A8 Luxury Sedan. In this model, the driver can safely turn their attention away from the driving tasks, e.g. the driver can text or watch a movie. The vehicle will handle situations that call for an immediate response, like emergency braking. The driver must still be prepared to intervene within some limited time, specified by the manufacturer, when called upon by the vehicle to do so. When activated by the human driver the car takes full control of all aspects of driving in slow-moving traffic at up to 60 kilometers per hour. The function only works on highways with a physical barrier separating oncoming traffic.

To support all levels of automation, today there are three types of navigation systems being evaluated: 1) Camera over radar relies predominantly on camera systems, supplementing them with radar data. 2); Radar over camera relies primarily on radar sensors, supplementing them with information from cameras; and 3) a hybrid approach that combines light detection and ranging (LIDAR), radar, camera systems, and sensor-fusion algorithms to understand the environment at a more granular level. Each of these systems has its pros and cons.

Most systems currently under development are hybrid and include LIDAR for navigation—a notable exception is the current TESLA guidance system which uses camera and radar. It is the function of LIDAR to determine where it is safe to drive. LIDAR is a surveying method for measuring distance to a target by illuminating that target with a pulsed laser light, and measuring the time-of-flight of reflected pulses with a sensor (photodetector). To do so, a LIDAR system scans the vehicle's full environment, typically 360 degrees in the horizontal and about 27 degrees in the vertical, and in some systems does so up to twenty times a second. The system is continuously detecting and defining objects all around, as well as their distance, size and trajectory. In doing so, a LIDAR system creates what is called a 'point map' so that software algorithms can classify objects all around the vehicle as stationary or in motion. Combining sensor data with computer algorithms, the system is capable of defining objects currently in in the path of the vehicle and/or objects with trajectories that will be in the path of the vehicle. Examples of obstacle detection and avoidance products that leverage LIDAR sensors are the Autonomous Solution, Inc. Forecast 3D Laser System and Velodyne® (Velodyne Lidar, San Diego, Calif.).

Despite extensive real-world testing, these systems are still error prone. The first deadly crash involving a semi-autonomous vehicle occurred in Williston, Fla. on May 7, 2016 while a Tesla Model S® (Palo Alto, Calif.) electric car was engaged in Autopilot mode. The crash occurred when a tractor-trailer made a left turn in front of the Tesla at an intersection on a non-controlled access highway, and the car failed to apply the brakes. The car continued to travel after passing under the truck's trailer. Note that the Tesla does not use LIDAR for navigation.

Less deadly but still concerning is the crash on Feb. 14, 2016 when a Waymo® (Alphabet Inc., Mountain View, Calif.) automatic vehicle (VA) attempted to avoid sandbags blocking its path. The vehicle had moved to the far-right lane to make a right turn, but stopped when it detected sand bags sitting around a storm drain and blocking its path. The Waymo AV began to proceed back into the center of the lane to pass the sand bags. As the Waymo AV was reentering the center of the lane, it made contact with the side of a bus. It was using a LIDAR system.

While navigation systems will continue to evolve and become more reliable, there will continue to be situations and context in which the vehicle's control system may not detect, and therefore not react, to the challenge of an unexpected or complex overload of competing threats. It would be advantageous then for these systems to have a more fail-safe means of detecting objects of potential concern and react accordingly or alert the vehicle's occupant.

It would therefore be advantageous to alert the vehicle's control system to objects of superior priority that are about the vehicle. Objects that present a particular concern to a semi-autonomous vehicle or an autonomous vehicle are objects that may pose a threat to the vehicle, or where the vehicle may pose a threat to the object, or where the object requires an action other than avoidance. For example, with the accident involving the Tesla and the trailer tractor, the trailer was a clear threat to the car but its navigation system failed to recognize it as such. A semi-autonomous or autonomous vehicle may pose a threat to objects on the road, such as workers on the side of the road, where the presence of workers may be an unexpected obstacle on the road and not recognized as such. Or the detection of an object may require a certain action by the vehicle that is unique by law, such as not passing a stopped school bus or maintaining a certain separation distance when passing a bicyclist. These objects are not identified as requiring special actions as LIDAR does not identify objects.

LIDAR by design determines distance, object size and trajectory but does not uniquely identify the object. In human navigated cars, objects about the vehicle are readily identified, and appropriate action is taken by the driver. Even then, objects of import such as a school bus, road worker, or bicyclist have special rules, regulations or common courtesy that should be obeyed.

Further, regulators have evolved a series of laws, regulations, or standards to further improve vehicle safety by heightening the identification of objects of import via standardized colors, lights, and shapes therefore making it easier for the human eye to detect and thereby improve safety and avoid collisions. Most notable are; tail lights, brake lights, traffic control and direction signs, barriers and flags. Active highlighting, such as tail lights, brake lights, and stop lights are reserved for the most critical situations. Conversely, passive highlighting is used in less critical situations, such as traffic control signs, directional signage, or barriers. However, the human eye and brain can, in some complex situations, be overwhelmed by the intensity or density of information that typically must be processed in seconds or even milliseconds to avoid accidents. In particular, in low light or dark conditions the use of retroreflective material has been mandated as a passive highlighting mechanism. To help the driver, certain standards in the form of laws and regulations have evolved to dictate the appearance of some common road objects.

For example, the National Highway Traffic Safety Administration (NHTSA) in the US published a rule requiring that commercial vehicles of certain size be equipped on the sides and rear with a means for making them more visible on the road. More specifically, NHTSA rule dictates trailer manufacturers install either red and white retroreflective sheeting or reflex reflectors. These materials must further be of a certain width, DOT-C2 50 millimeter (mm) wide, DOT-C3 75 mm wide retroreflective sheeting, or DOT-C4 100 mm wide retroreflective sheeting. Further, there are standards for retroreflective materials for traffic control as outlined in the American Society for Testing and Materials (ASTM) D4956-90, published December 1990, "Standard Specification for Retroreflective Sheeting for Traffic Control." (ASTM International, 100 Barr Harbor Drive, PO Box C700, Conshohocken, Pa. 19428-2959)

A retroreflector is a device or surface that reflects light back to its source with a minimum of scattering. Unlike a mirror, a retroreflector reflects light directly back to the light source. A mirror only does so if the light source is perpendicular to the mirror. Therefore, a retroreflector can reflect light back to a car as it moves and changes its angle relative to the retroreflector. This is particularly helpful in road signage where the sign is illuminated brightly for a driver as the vehicle approaches and passes the sign. Vehicles adorned with retroreflectors are readily apparent regardless of the angle of the retroreflector to the driver. For example, the retroreflector on the side of a trailer on a dark night will reflect the light of a vehicle's headlights back to the driver making the trailer much more conspicuous. Therefore, retroreflectors have helped to avoid many collisions.

A primary use of retroreflectors is in signage. Road signs use shapes, colors, words, and symbols to communicate a message to drivers but virtually all traffic signs use retroreflective sheeting. This sheeting, designed to reflect some of the light from an approaching vehicle's headlights back to the driver, will make the sign visible at night. Sign shape can also provide cues to motorists even when the words or symbols on the sign are unintelligible by defining the shape with retroreflective sheeting. The Federal Highway Administration in the US has developed the design details of signage which is found in its Manual on Uniform Traffic Control Devices for Streets and Highways. In the regulation, it specifies that: Regulatory signs shall be retroreflective or illuminated to show the same shape and similar color by both day and night, unless specifically stated otherwise in the text discussion in this.

Another ubiquitous use of retroreflectors is in road stripping—the typically white lines that run along the center and shoulder of a road. In the early 1940's, during World War II, reflective beaded lines were used on highways in the US to expedite traffic during blackouts. World War II was largely responsible for the widespread acceptance of incorporating retroreflective beads into stripping to provide nighttime delineation due to the blackout condition imposed. Using beaded lines for nighttime reflectivity is now accepted worldwide. The advantages of using reflective beads are apparent when driving on a rural road at night.

More recently, roadways have been blanketed with Raised Pavement Markers, these are the retroreflectors embedded in the centerline of the road to provide point reflections for motorists and help to separate opposing traffic. In the UK, they are referred to as Cat's eyes, and consist of two pairs of retroreflective glass spheres set into a white rubber dome, mounted in a cast-iron housing. They generally come in a variety of colors and have enjoyed widespread usage in the British Isles and elsewhere around the world.

Another use of retroreflectors is defined by ANSI/ISEA's February 2016 High Visibility Clothing standard update, the ANSI/ISEA 107 High Visibility Safety Apparel, and the ANSI/ISEA 207 Public Safety Vest standards for workers on the road or for fire, police and medical personnel. These specifications allow for both silver reflective and prismatic materials meeting the ANSI/ISEA 107-2010 High Visibility Standard, and both are retro-reflective—light from traffic is reflected from the safety tape back to the drivers, allowing them to see roadside workers sooner and at greater distances.

Our roadways have evolved methods and technology to make driving safer by highlighting objects of concern. How will semi-autonomous or autonomous vehicles leverage these same methods and technology? For example, had the Tesla's navigation system, mentioned earlier, had a means of detecting the unique signature of a retroreflector on the side of the tractor trailer it may have avoided the crash. Similarly, if the Waymo car had a means of detecting the retroreflector on the side of the commercial bus, it may have avoided the accident. Clearly, there is need for vehicle navigation to leverage the ubiquitous use of retroreflectors as a means of alerting the control system or the occupant of an object of concern.

The definition of a semi-autonomous or autonomous vehicle is not intended to be limited to roadway vehicles such as cars, buses, trucks, tractor-trailers but also extends to railroad locomotives, sailing vessels, robotics, airborne low-flying vehicles such as drones, or any device under locomotion.

The burgeoning market for semi-autonomous and autonomous vehicles (AVs) is challenging current technology to navigate safely through our ever changing and congested environment. As AV developers test their designs in real-world environments, reports of accidents are increasing, some fatal to driver and pedestrian alike. With every accident, there is a pursuit by developers for an answer to a new problem. How can the navigation system of an AV have avoided that accident? Can an AV's navigation system ever be perfected to anticipate every new threatening situation?

As with all burgeoning technology, technological trade-offs are being made to expeditiously enter the market with available technology and acceptable minimal performance specifications. These trade-offs are elected to focus and address the primary threats to an AV. Speed of surveillance (the number of scans per second), for example, is necessarily increased to improve reaction time by lowering spatial resolution. However, lower resolution means limited ability to identify objects. Being able to detect threats and identify objects then necessitates additional equipment, such as combining LIDAR systems with visible imaging cameras. Fusing data from two systems necessitates more processing power, which drives up system cost.

Reaction time is critical. Detecting and processing a threat and assuring safety takes computational effort and is tempered by the need to minimize unnecessary slowing or breaking.

A fundamental challenge is that AV systems are being designed to navigate an environment that has been optimized for human vision and not machine vision. If ultimate safety is to be achieved, the environment must be, and will eventually be, designed to leverage the strengths and capabilities of machine vision and electronic sensors. For example, when humans view a stop sign, the letters of the stop sign are clearly readable at a reasonable distance, the color red is unique, and the octagonal geometry is uniquely associated with stop, providing three visual clues regarding the meaning of this critical element of traffic control. A camera and computer vision system, given sufficient light and sufficient resolution can also image and interpret the same sign. But most guidance systems today use LIDAR (light detection and ranging), which is blind to color and lacks resolution to 'read' the sign. Thus, a LIDAR system is joined with a camera system in AVs to obtain sufficient information about the environment to enable safe navigation. Fusing LIDAR data with camera data takes valuable computation time and involves another layer of processing to enable safe navigation.

Combining data from LIDAR and camera, and/or other combinations of navigation technology, such as radar and cameras, or Flash LIDAR and cameras, demands more complex systems that may never be perfectly capable of navigating an environment in continual flux. Some AV systems attempt to combat these challenges by anticipating the sharing of data. For example, a forward vehicle making an avoidance maneuver may wirelessly transmit information regarding the maneuver or threat situation to enable following AVs to perform the same or similar maneuvers. Many scenarios present changes in the roadway environment that software engineers are still grappling with how to minimize threat to the vehicle or vice versa.

As with many complex man-designed systems, one answer to the safety concern is redundancy. Modern airliners have redundancy such that one engine can fail and the plane safely flies. Redundant braking systems, still the norm in passenger vehicles, uses hydraulic breaking backed by driver electable mechanical breaking. Combining a LIDAR system with a camera, for example, is not redundancy; rather, the combination is a single primary system for locating and recognizing objects and threats.

All roadway designs have benefited from an understanding of how the human driver senses and responds to the environment. Driver vision is helped with lighting at key intersections and brightly painted guidelines to help the driver maintain the vehicle in an appropriate position on the road—often with less than a meter away from another passing vehicle. Roadway engineering considers signs and guides for control, direction and safety. Roadway designs, signs and guides have been standardized over the years and proven to work well for human drivers.

With AVs, the current state of retroreflector use optimized for humans may not be appropriate or optimized for the capabilities and trade-offs of electronic sensors and navigation systems. To significantly enhance detection by AVs and improve safety of AVs, a system is needed that leverages redundant threat identification and leverages retroreflective taggants optimized for detection by machine vision systems.

FIG. 1 illustrates a schematic block diagram of a system 100 for photonically detecting an object of high-interest in a scanned volume. A laser source 101, typically an eye-safe infrared wavelength (940 nm or 1550 nm) is used to project a coherent wave 102. A photoelectric detector 103 is collocated with the laser source 101 such that reflections 104 of the laser source may be detected. While conventional LIDAR systems use the time-of-flight to determine distance, the system 100 uses the amplitude of the reflected light 104.

Laser aiming, both in rotational angle and azimuth, is controlled by and recorded by the laser positioning module 105. The laser positioning module 105 comprises motors that orient the laser or lasers to rotation angle and azimuth coordinates, and is configured convey rotation angle and azimuth coordinates to the processing module 107. The processing module 107 is a computing device configured to control the laser source 101 and laser positioning module 107 and receive data from the laser positioning module and the photoelectric detector 103. For each unique coordinate of rotation angle and azimuth there is also a corresponding reflection amplitude detection that is sensed by the Photoelectric Detection Module 103. For systems using a 2D system, the x, y coordinate system may be used to store point measurements.

The Photoelectric Module 103 detects only the wavelength of the scanning source and converts the sensed light into an electrical signal, which in turn is converted into a digital code. The digital code that represents the intensity of the received signal is typically represented in binary code between 0 and 255 with 255 representing saturation of the detector. In LIDAR systems, the reflected signal is averaged to the mid-values by varying the strength of the light source. For this reason, most objects will have a reflection amplitude much less than the saturated level of 255. In some cases, where the average reflected amplitude for a scene is low, the definition of a saturated level may be considered to be less than 255 but significantly above the average reflected amplitude.

In some embodiments, the photoelectric detector 103 is a single (i.e., 1D) detector having a single amplitude value for light impinging upon it. Such a detector may include a collimator such that light striking the detector is limited to a narrow angle. Such a photoelectric detector 103 may be positioned parallel to the laser source 101 (e.g., boresighted with the laser) so that the detector measures the intensity of reflected light along the axis of the laser beam. In such embodiments, the location of a retroreflector in the environment may be determined based upon the rotational angle and azimuth of the laser positioning module 105, as well as the time-of-flight data that can be used by the processing module 107 to determine the distance to an object such as a retroreflector.

In some embodiments, the photoelectric detector 103 may include an array of detectors organized as pixels (i.e., a 2D detector). In such embodiments, the photoelectric detector 103 may include a lens configured to focus light onto the detector array similar to digital cameras. In such embodiments, the location of the retroreflector in the environment may be determined based upon the X, Y coordinates of the pixel or pixels within the detector array that detect retroreflected light (e.g., indicating an amplitude at or near the saturation level of 255), in combination with the rotational angle and azimuth of the laser positioning module 105, as well as the time-of-flight data that can be used by the processing module 107 to determine the distance to an object such as a retroreflector.

The Processing Module 107 receives an incremental coordinate of rotational angle and azimuth from the laser positioning module 105 and simultaneously a value from the Photoelectric Detection Module representing the digital value of the sensed light intensity 106. The processing module 107 may also receive a time value for light detections from the photoelectric detection module 103, which may enable the processing module to determine the time-of-flight, and thus the distance to the object reflecting light. The Processing Module 107 may store each pair of location and intensity data in Memory 108. When an entire scan is complete, typically comprising a 360-degree sweep and about a 27-degree elevation, an analysis is done by the Processing Module 107 of the stored values using a software algorithm Executing the software algorithm, the Processing Module 107 will search for contiguous saturated points. Embodiment systems that use a 2-D point map may use a raster scan to produce a 2D array of measurements with the X-Y coordinates and reflection amplitude values similarly stored and analyzed.

A 'closest neighbor' software algorithm may be used by the Processing Module 107 to detect the number of contiguous saturated values of all the values collected in a single full scan. The number of contiguous saturated values depends on the resolution of the system and the relative size of the retroreflector. Typical LIDAR systems may have a resolution of about 2 cm at distance. Thus, a commercial vehicle may have a retroreflector strip 4 to 6 cm in width and 200 to 1000 cm or more in length. A safety vest may have a retroreflector strip of 4 cm wide and more than 24 cm long. Thus, a threshold of 10 to 100 saturated contiguous hits may be used to reduce false alarms.

Figure 2:
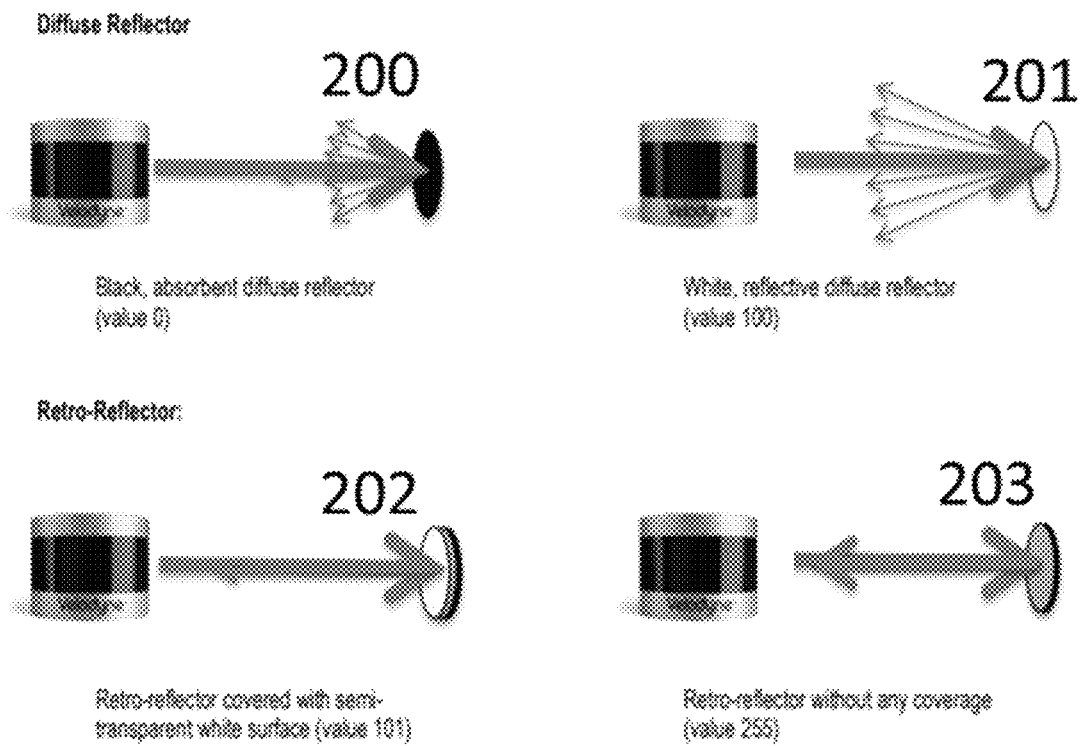
FIG. 2 is a diagram showing the relative reflections amplitude of a retroreflector vs other reflectors in accordance with various embodiments.

FIG. 2 depicts the relative reflection amplitude in a LIDAR system amongst black objects 200, white specular objects 201, an occluded retroreflector 202, and a bare retroreflector 203. The relative equivalent binary representations of the reflected intensity are respectively: 0, 100, 101, and 255. Where 255 represents the typical value associated with a retroreflector in a scene and is also the saturation level of the photodetector—there can be no higher value.

Figure 3:
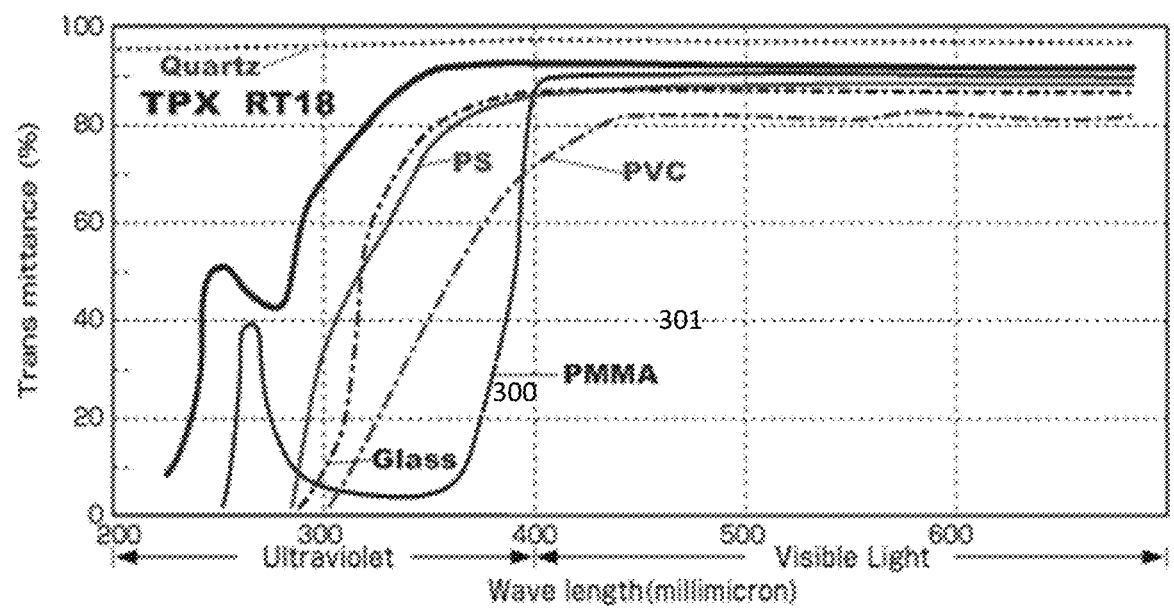
FIG. 3 is a graph showing the transmission efficiency vs. wavelength of retroreflective materials.

FIG. 3 is a graph showing the transparency as a function of wavelength of materials typically used to manufacturer retroreflecting beads. Glass 300 and PMMA 301 are shown to be as transparent in the visible spectrum as they are for the infrared wavelengths of interest in LIDAR scanning systems. This means that both glass and plastic retroreflectors will be as responsive to infrared as they are to the white light of a car's headlight.

Figure 4:
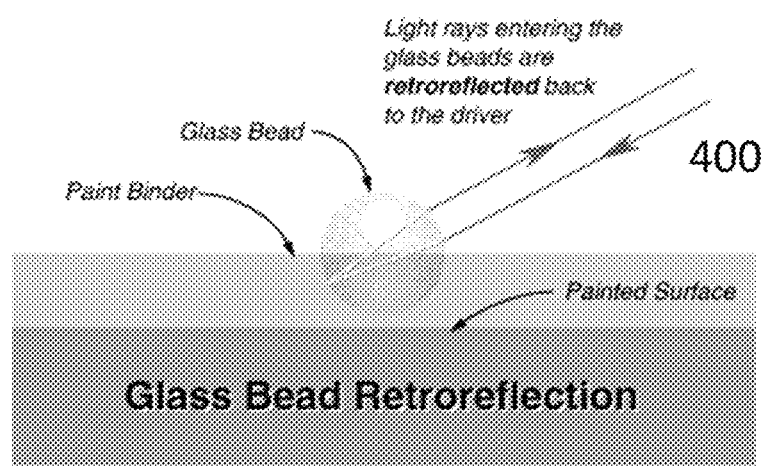
FIG. 4 is a graphic representation of a retroreflection in a cross-section of a glass bead.

FIG. 4 illustrates the optics of an individual retroreflector bead 400. Road signs, raised pavement markers, road way stripping, and signage typically have hundreds to many millions of these beads with each acting to reflect the imposed light. Key to the high brilliance of a retroreflector is the fact that light rays are reflected directly back to the source—regardless of the angle of incidence. This suggests that retroreflectors, to the side or skewed relative to the projection system, are also detectable. It further suggests the need to have the photoelectric detector 103 collocated with the laser source.

Figure 5:
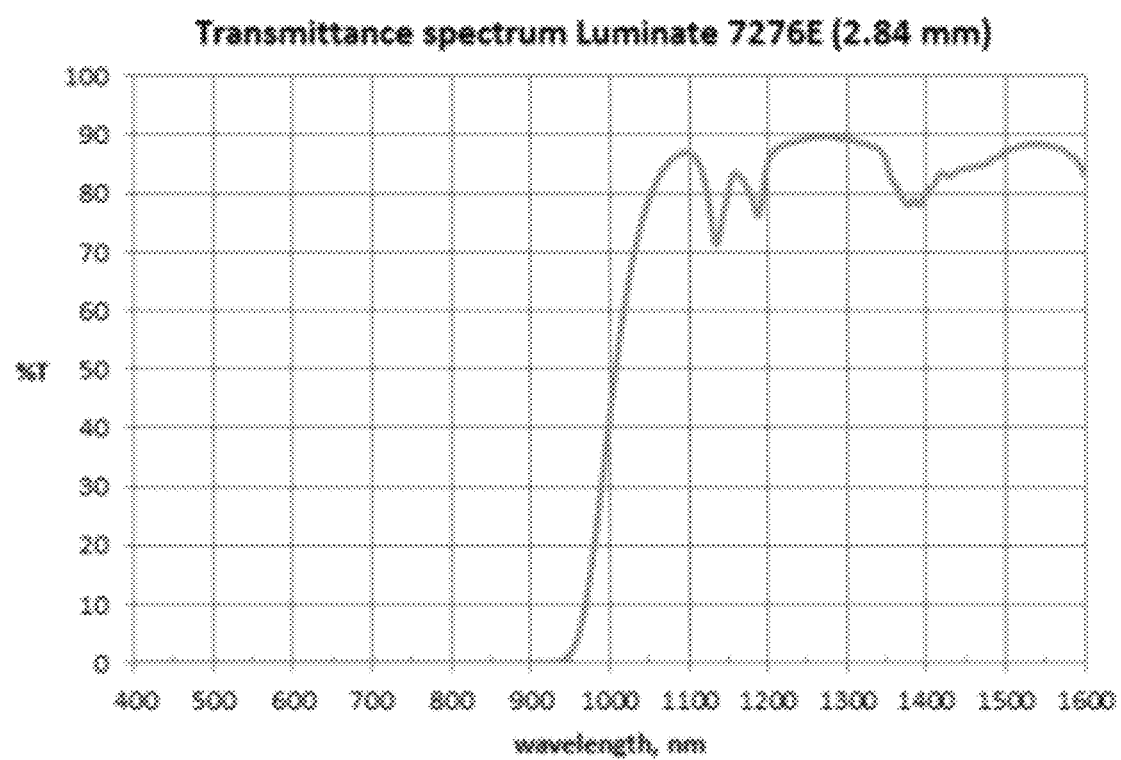
FIG. 5 is a graph showing an example of one material's transmittance spectra in terms of the percentage of transmittance vs. the wavelength of transmittance.

FIG. 5 is a graph showing the transmittance as a function of wavelength of a special polymer mix that is opaque to visible light but transparent to IR light. Various embodiments include IR reflective retroreflective beads made of such polymer materials. These unique beads may be the future standard for retroreflective taggants of various embodiments to enable LIDAR systems to identify objects of heightened avoidance. Polymers may work uniquely with IR systems, and not be detectable by the human eye. As such, various embodiments provide a unique means of heightening awareness by LIDAR systems for self-driving autonomous vehicles.

When an AV is operational it may use a LIDAR system or another dedicated laser-scanning system. As the scanning system scans the environment it is constantly detecting objects of certain size and trajectory. Various embodiments allow for the additional function of detecting objects displaying retroreflectors. Detecting any number of retroreflectors in a vehicle's environment can activate the system providing the number of contiguous detections for any grouping exceeds a predefined threshold. Since the IR laser is operational day and night, so is the detection of retroreflector, because the optics of LIDAR systems typically have an IR filter to block visible light from reaching the photodetector. This is a key point; the detection of retroreflectors that work predominantly for human drivers at night superiorly work for an IR scanning system day and night.

Detection of ubiquitous retroreflectors on and about the roadway, such as a raised pavement marker, signage, and stripping, will be detected along with retroreflectors associated with objects of heightened priority. Such detections may be dismissed as a false alarm. However, retroreflectors adhered to a school bus, tractor trailer, or any large commercial vehicle will also be detected and need to be addressed by an AV system accordingly. Retroreflectors associated with objects of concern, such as a worker's safety vest, bicyclist with retroreflector on person or on bike, stopped mail truck, all present obstacles with potentially non-standard maneuvers. Non-standard maneuvers may include; a stopped school bus in the right lane may not be passed whereas a common bus can, a bicyclist must be passed but some local laws require more than four feet of clearance, or a postal truck may dart out or may have an erratic and sudden acceleration or deceleration. Detecting the unique signature of the retroreflectors adhered to these vehicles or people will provide an added level of safety and alertness to the AV control system.

All retroreflectors in use today perform in both the visible and infrared, including both glass bead and plastic retroreflectors. In some embodiments, a heightened security system will detect retroreflectors that only reflect IR and not visible light, providing an increased level of unencumbered alert.

Various embodiments include a retroreflector that reflects only IR light (unlike retroreflectors in use today that reflect both visible and IR light) and a system that can detect this unique retroreflector. On any road then, in accordance with various embodiments, there may be a combination of traditional retroreflectors and IR-only retroreflectors. IR-only retroreflectors may present a new roadway safety standard to provide specific and heightened detection of objects for detection by self-driving autonomous vehicles equipped with IR scanning systems.

IR-only retroreflectors may be produced from polymers that are opaque to visible light but transparent to IR light or have a coating that acts similarly. Various plastic materials may be compounded with dyes to have this property. FIG. 5 shows the transmittance spectrum of one commercially available polycarbonate material that has this property that may be used in making retroreflector beads according to various embodiments.

In use, the scanning system will use two wavelengths of light. The first wavelength, typically 910 nm or 940 nm, may be used to scan the environment as normally. A secondary laser emitting light with a wavelength greater than 1100 nm may also be used to scan the environment. Today's retroreflectors will reflect both of these wavelengths of light. However, only the 1100 nm (or greater) laser will receive a refection from IR-only retroreflectors. In embodiments using a 1D photoelectric detector, comparison of amplitude values detected in both wavelengths at the same rotational angle and azimuth of the laser positioning module 105 will reveal retroreflectors made from IR-only material. In embodiments using s a 2D pixelated photoelectric detector, a comparison of saturated pixels detected in both wavelengths will reveal retroreflectors made from IR-only material. Operating the scanning system to detect IR-only retroreflectors may indicate objects of heightened concern for self-driving autonomous vehicles.

In various embodiments, IR-only retroreflectors may be incorporated on all future emergency vehicles, safety vest and safety equipment to enable autonomous vehicles to differentiate such objects from common roadway retroreflectors and provide a high level of detection. This may lessen the processing burden of having to eliminate unimportant retroreflectors by image analysis as described earlier.

Retroreflectors are available in an extensive array of sizes, reflectance efficiency, cost and design, and are available as a singular retroreflector or produced in an array of a multiplicity of retroreflectors. Various embodiments are applicable to all types and designs of retroreflectors.

Some embodiments use a retroreflector that is a sphere with a reflective coating. The sphere may be made from polymer or glass material and have a reflective backing that is vapor deposited, painted on, embedded into a highly reflective backing.

Figure 6:
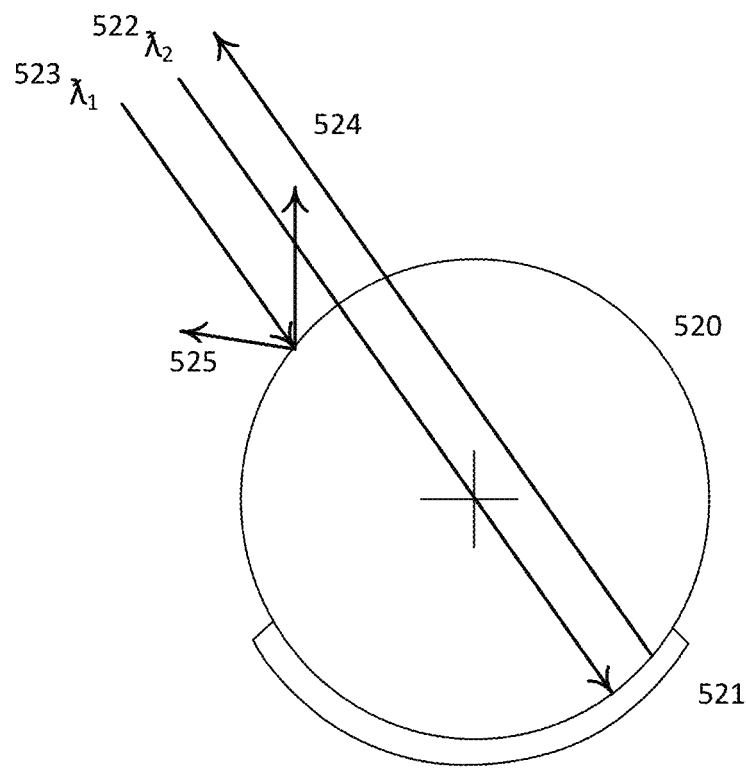
FIG. 6 is a graphic representation of a cross-section of a retroreflector selectively reflecting IR wavelengths.

Unlike a mirror, which only reflects light directly back to a source that is precisely orthogonal to the mirror (i.e., the angle of incidence is 90 degrees), a retroreflector reflects light directly back to the source from virtually any angle of incidence. FIG. 6 depicts a beam of light 522 entering the anterior portion of a spherical retroreflector 520 and being reflected by a posterior reflecting element 521, reflecting directly back to the source 524 (lines shown separated for clarity). Spherical retroreflectors can be made as an individual reflector or made into unlimited sized arrays of retroreflectors. They are available as tapes, hard plastic, in discrete shapes, or made into flexible self-adhesive tapes for covering lengths of objects such as the side of emergency vehicles.

As illustrated in FIG. 6, the use of two different electromagnetic wavelengths ($\lambda_1$ and $\lambda_2$) in the scanning system results enables the system to differentiate IR-only retroreflectors from common retroreflectors. Retroreflector material is selected such that it may be transparent to the one wavelength $\lambda_2$ and opaque to another $\lambda_1$. A common retroreflector reflects all wavelength, whereas IR-only retroreflectors of various embodiments only reflect a certain range of IR wavelengths $\lambda_2$. Thus, photons of the incoming light 522 from the scanning system of one wavelength $\lambda_1$ will be scattered (525) while photons of the incoming light 523 from the scanning system of another wavelength $\lambda_2$ will be reflected (524).

Figure 13:
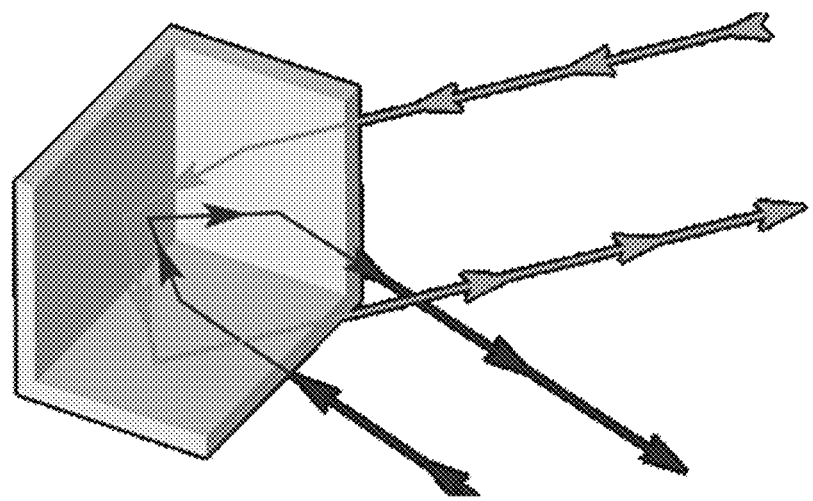
FIG. 13 is a graphic illustration of the reflection of electromagnetic radiation from any angle back to the source in accordance with various embodiments.

Retroreflectors may also be of the corner cube retroreflector type, also known as a CCR or trihedral prism. Such retroreflectors are an optical structure that consists of three adjacent, mutually-orthogonal plane reflecting surfaces that form the corner of a cube. The corner cube reflects an incident ray at a specific angle, independent of the prism and beam orientations as shown in FIG. 13. The mirror coating of a corner cube can be wavelength selective—absorbing some wavelengths while reflecting others. In various embodiments employing corner cube retroreflectors, the mirror coating is configured to reflect IR photons of a particular wavelength (e.g., 1100 nm) or longer and absorb or scatter photons of shorter wavelengths.

Figure 14:
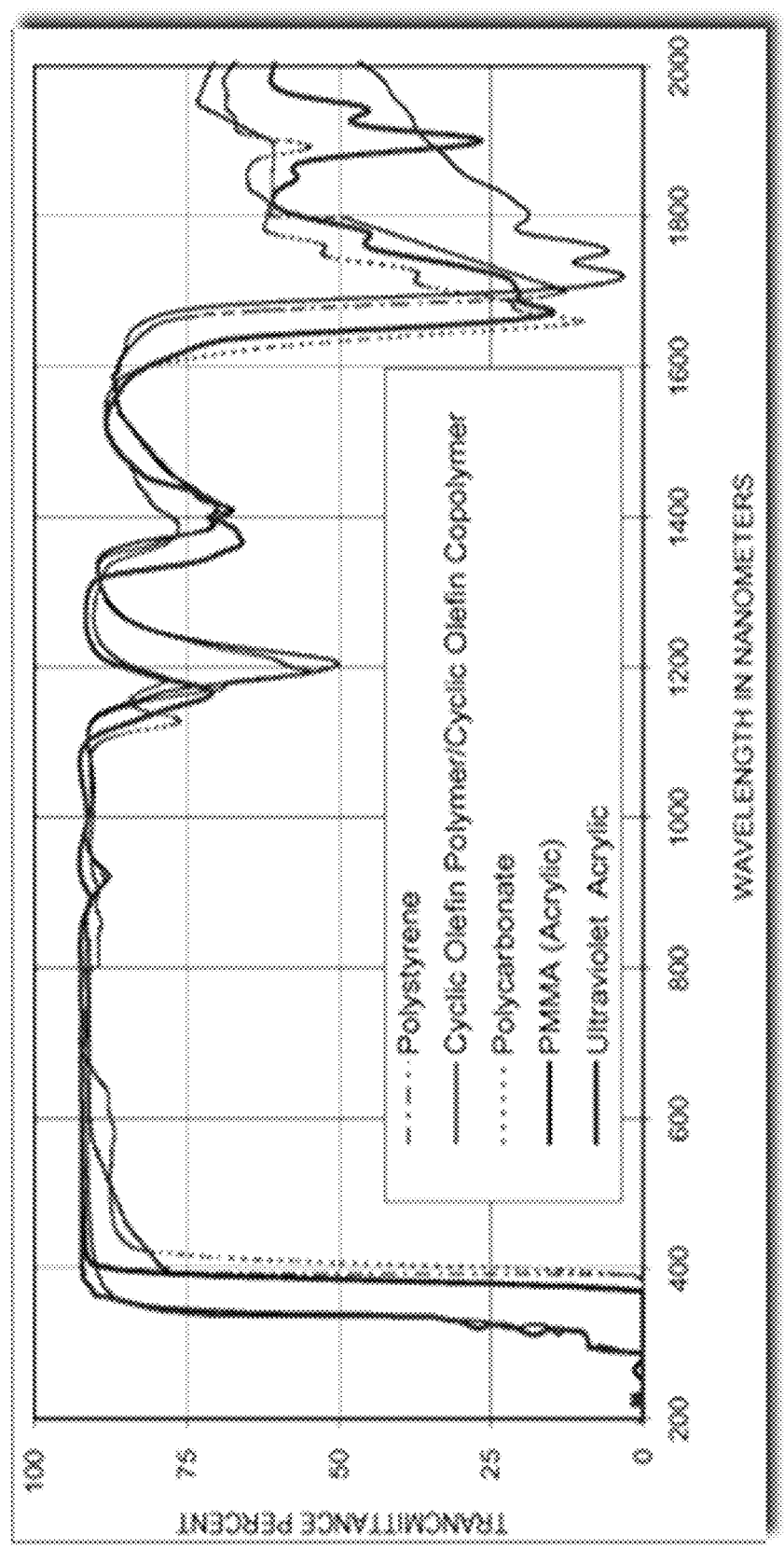
FIG. 14 is a graph showing the characteristic opacity of several polymers between 200 and 2000 nm.

Various embodiments include an IR-only spherical retroreflector that only reflects light in a certain portion of the infrared spectrum. Such a retroreflector either scatters or absorbs most wavelengths of electromagnetic radiation, including visible and some infrared, but reflects a selected band of wavelengths of radiation, preferably infrared. Selective reflection may be accomplished in at least two ways. The first method is to use a refractive material that is opaque to all wavelengths other than a selected wavelength of interest. It is typical for a LIDAR system in an AV system to use either 950 nm or 1550 nm infrared wavelengths as an illumination source. Both are invisible to the human eye and are considered eye-safe at the intensity projected. Selecting a sphere material that is opaque to all wavelengths except 1550 nm would make the retroreflector only reflective to the 1550 nm illumination source. FIG. 6 depicts this. The first incident ray 522 may be a wavelength of 1550 nm. As shown in FIG. 14, the opacity of a polymer tends to decrease at higher wavelengths. The sphere 520 may be made of a polymer that is transmissive to 1550, such as Luminate 7276E (Epolin Company, Newark, N.J.) shown in FIG. 5. If light 523 of another incident wavelength of about 900 nm impinges on the sphere, it will be absorbed or scattered 525 by the polymer. In this manner, an IR-only retroreflector can be uniquely identified by detecting and comparing the reflected intensity of the two wavelengths.

Figure 7:
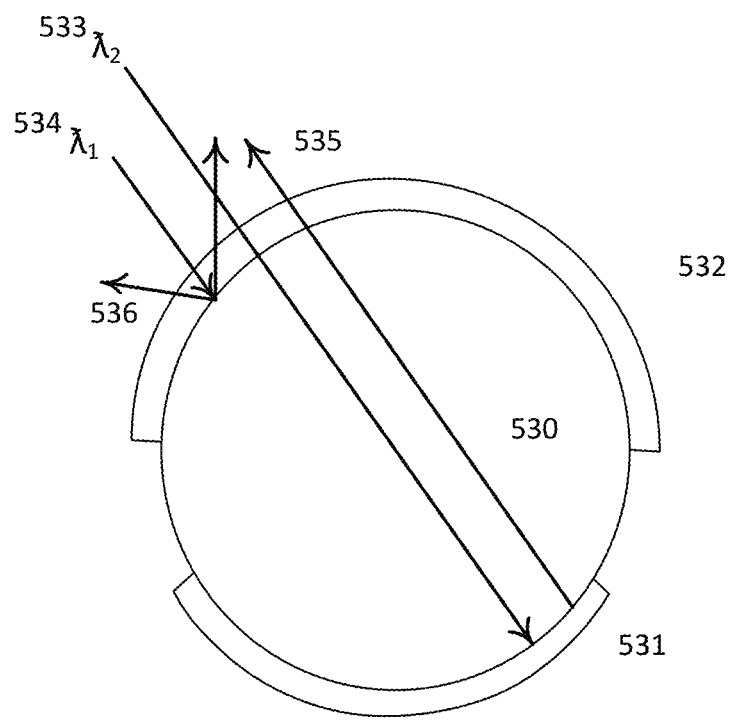
FIG. 7 is a graphic representation of a cross-section of a retroreflector with a wavelength-selectable retroreflector coating according to various embodiments.
Figure 15:
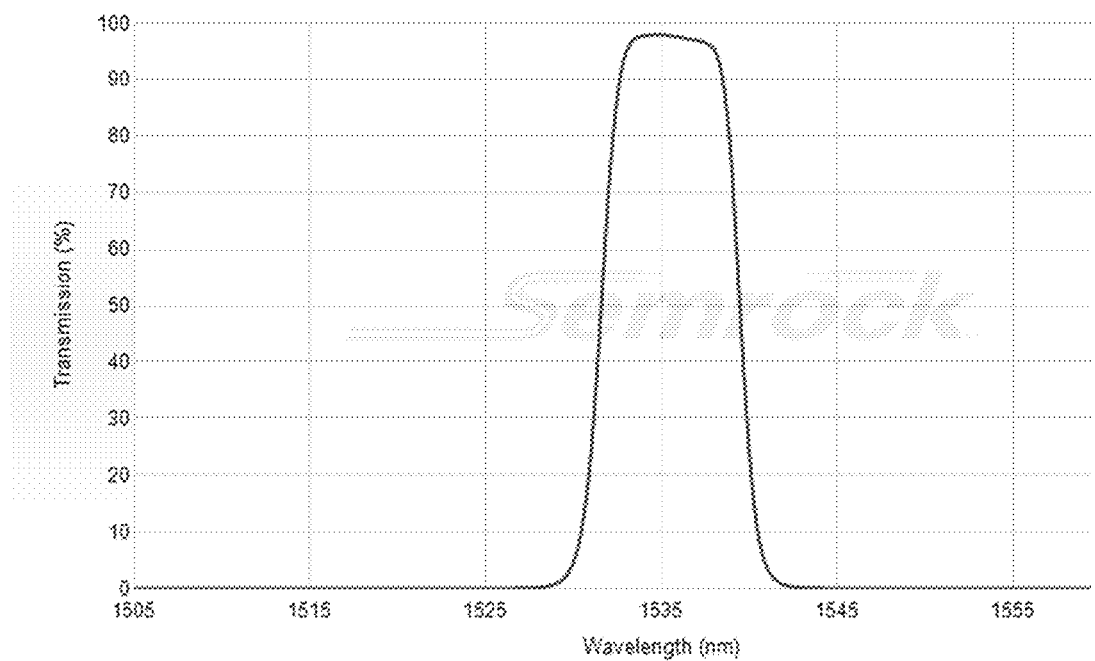
FIG. 15 is a graph showing the bandpass profile for a dichroic filter or absorber.

In the second method a more traditional retroreflective sphere can be partially coated with an optical filter material on its anterior to transmit only the preferred wavelength. A retroreflector with an optical filter, preferably a dichroic filter, is depicted in FIG. 7, which illustrates how a common retroreflector may be made IR selective with the use of coatings 531, 532, such as a dichroic filter coating, deposited onto the non-mirrored side of a spherical retroreflector 530 to provide optical filtering and allow one wavelength to enter and be reflected and another wavelength absorbed or diffusely reflected. The retroreflective sphere 530 has a reflective coating on its posterior 531 and a dichroic film 532 deposited on its anterior portion. A photon of suitable wavelength 533 travels through the dichroic filter 532 and is reflected 535 by the bottom mirror coating 531. Other wavelengths, shown as 534, impinge on the retroreflector but are diffusively reflected (536) or absorbed by the coating 532, thereby significantly reducing the intensity of the reflected radiation. FIG. 15 shows the bandpass profile for a dichroic filter or absorber.

Various embodiments include an IR-only corner cube retroreflector that only reflects light in a certain portion of the infrared spectrum and either scatters or absorbs other wavelengths. This may be accomplished in at least two ways. The first is to use a coating that is reflective of one wavelength and absorptive of another wavelength. For example, it is typical for LIDAR system for AV to use either 950 nm or 1550 nm wavelengths of infrared illumination. These are both eye-safe. Selecting a material that is reflective of 1550 nm but absorptive of 950 would make the retroreflector selective of the 1550 nm illumination source. Such wavelength specific reflected coatings are commercially available. For example, Alluxa® (Santa Rosa, Calif., USA) provides high-reflectivity dielectric mirrors that provide close to 100% reflection over a broad or precise range of wavelengths. A second means would be to coat the corner cube with a material that is reflective at one wavelength and transmissive of another. A dichroic filter, as detailed above, can be used to accomplish this. A corner cube retroreflector may be preferred over spherical retroreflectors for detection of singular objects at great distances.

The IR-only retroreflector will be optically unique in the environment for both its reflected intensity and for only reflecting a specific band of IR wavelength. Few natural or manufactured objects have an IR-only reflective property making the IR-only retroreflector a suitable taggant for enabling AV systems to detect objects of high import. This uniqueness is particularly detectable by machine vision sensors or LIDAR systems with addition of an additional interrogating illumination source. IR-only retroreflectors can be inexpensively incorporated into any format from a singular retroreflector to any shape or tape or painted onto a surface.

Contemporary LIDAR systems for AV navigation use only one IR wavelength of illumination. Some embodiments incorporate two different wavelengths into a scanning system. As described previously these two wavelengths are selected based on the reflectance characteristics of the IR-only retroreflectors of various embodiments.

Figure 8:
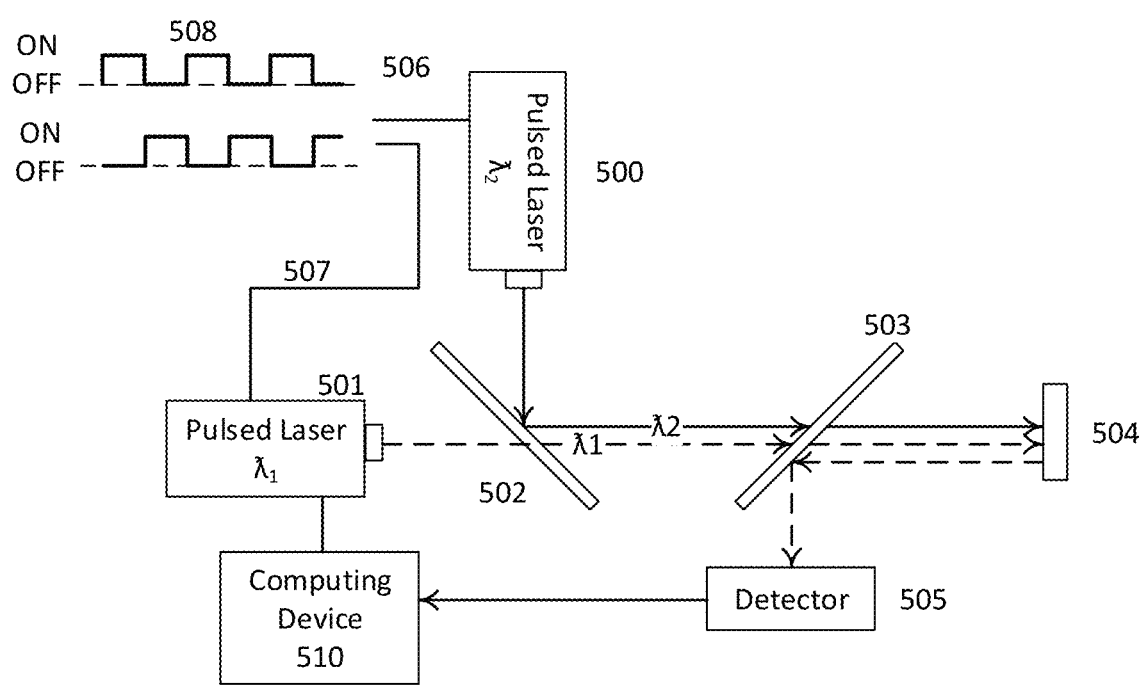
FIG. 8 is a schematic block diagram of an integrated dual wavelength LIDAR system for integrating two different pulsed laser wavelengths into a single LIDAR system for detection of an IR-only retroreflector according to various embodiments.

Some embodiments integrate a second pulsed laser having a wavelength that is different than that of the first laser. In FIG. 8, an embodiment of a dual laser system is shown. The first laser 500 is of a wavelength $\lambda_1$ that will not be reflected by the retroreflective target 504. A second pulsed laser 501 is of a second wavelength $\lambda_2$ that will be reflected by the retroreflective target 504. Both laser beams travel along a common path—first either through or reflected by an optical splitter 502. Each laser may be controlled (e.g., by a computing device 510) to alternately pulse as shown in 508, with an on-off control 506 driving the first laser 500 and a secondary pulse train 507 controlling the second laser 501. These pulse trains are for illustrative purposes only as there may be an off-time for both lasers during which time-of-flight data is accumulated. For most objects in the environment, both wavelengths are reflected back equally depending on their reflectivity characteristics. A detector 505 detects the reflected radiation intensity which is then converted into a digital value that may be processed and/or stored in memory by a computing device 510. The optical intensity of the two reflected beams may be compared by the computing device 510. Reflections from a traditional retroreflector typically saturate the photodetector for both wavelengths and are therefore easily differentiated from an IR-only retroreflector. If an IR-only retroreflector is detected, it is differentiated by the computer controller by having only one of the two wavelengths reflected. In other words, reflections from an IR-only retroreflector target 504 will only be received by the detector 505 during the "on" cycle of the second pulsed laser 501 when the second wavelength $\lambda_2$ of light is emitted reflected by the retroreflective, while reflections from a conventional retroreflector will be received by the detector 505 during the "on" cycle of both of the first and second pulsed lasers 500, 501.

In scanning LIDAR systems according to various embodiments, the power of the laser pulse may be modulated to minimize saturating the detector. That is, optical power may be lowered when most objects are nearby and increased when most objects are at greater distance. In this manner mostly highly reflective objects, such as retroreflectors, will saturate the photodetector 505 while reflections from other objects will not saturate the photodetector 505. With various embodiments, even if there are many highly reflective objects in the environment, only the IR-only retroreflector will appear as non-reflective with one of the two wavelengths.

Figure 9:
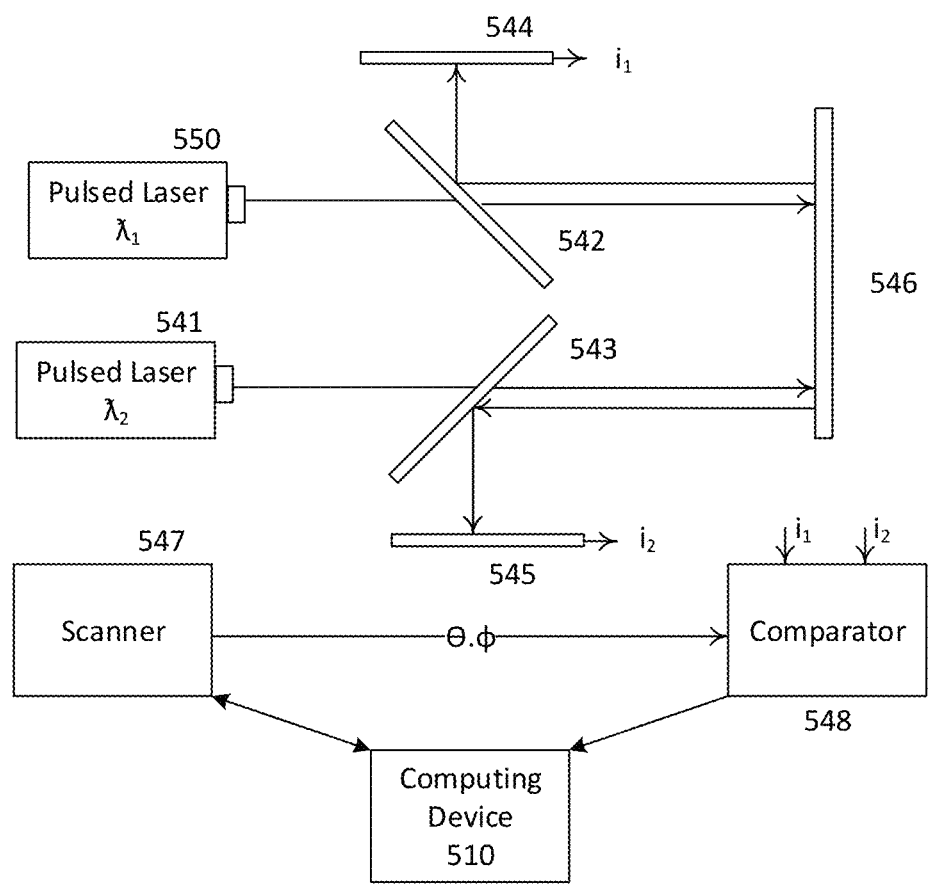
FIG. 9 is a schematic block diagram of a dual LIDAR system that adds a laser scanning system to an existing LIDAR system but having a different projected wavelength for detection of an IR-only retroreflector according to various embodiments.

Various embodiments can be used with an existing LIDAR system. FIG. 9 illustrates this arrangement according to an embodiment. In this embodiment, a first laser 540 projects light at a wavelength $\lambda_1$ that is reflective by the IR-only retroreflector target 546, and a second laser 541 projects light at a wavelength $\lambda_2$ that is absorbed or scattered by the IR-only retroreflector 546. Laser 540 and laser 541 may be positioned on a mechanical scanner, such as a laser positioning module 105, so that both laser beams illuminate the same point in a 3-D space. Laser 540 projects a beam that passes through a first optical splitter 542 and impinges on a target 546. Any reflected light is directed back to the source and is redirected by the splitter 542 onto a first photoelectric sensor 544. The photonic intensity $i_1$ at the first detector 544 is preferably converted into a digital representation and sent to a comparator 548. Similarly, the second laser 541 projects a beam that passes through a second splitter 543 and impinges on the target 546. Any reflected light is directed back to the source and is redirected by the second splitter 542 onto a second photoelectric sensor 545. A photonic intensity $i_2$ detected by the second photoelectric sensor 545 is preferably converted into a digital representation and sent to the comparator 548. The intensity data, either in digital or analog form, from both sensors 544, 545 may be compared by the comparator 548 or by a computing device 510 coupled to the comparator. If the target 546 is an IR-only retroreflector then the detected intensity of one wavelength $\lambda_1$ will be much greater than the intensity of the other wavelength $\lambda_2$. For each point in space where this occurs, as may be determined based on rotational angle and azimuth of the laser positioning module 105 plus a time of flight measurement, a detection may be noted by the computing device 510.

Figure 10:
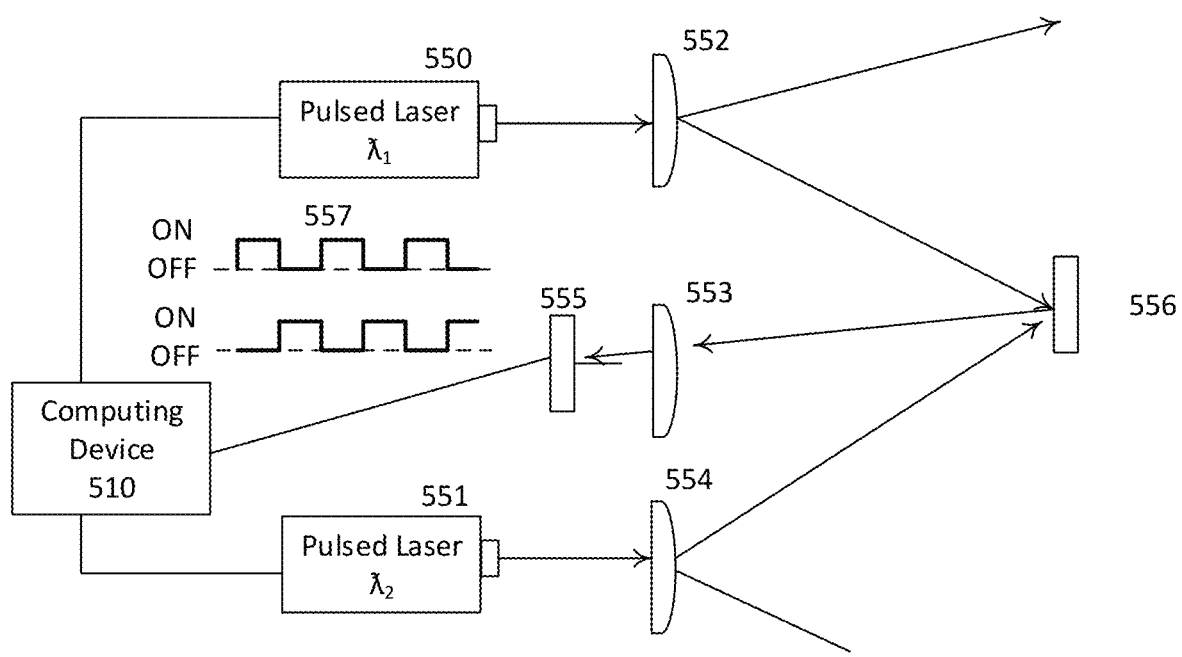
FIG. 10 is a schematic block diagram of a Flash LIDAR system that adds a Flash-laser system to another Flash-LIDAR system having a different projected wavelength for detection of an IR-only retroreflector.

Some navigation systems do not use a scanning laser-detector arrangement but rather illuminate the entire areas of an environment, or some sub portion with a flash of wide-angle radiation. Such flash systems can be used with various embodiments. A flash system uses a broad illumination pulse and an imager. FIG. 10 illustrates such a system in which a first laser 550 is the main illumination source emitting light with a first wavelength $\lambda_1$. A lens 552 is used to diverge the beam of light emitted by the first laser 550 to cover a wide area. Objects 556 in the environment reflect back light according to their distance and reflectivity. The intensity, location, and time-of-flight of the reflected beam are determined by an imager 555, which may provide digital data to a computing device 510. An embodiment includes a second laser 551 emitting light with a wavelength $\lambda_2$ that is not reflected by the IR-only retroreflector 556. By alternately pulsing the two lasers 550, 551 as shown in the control pattern 557, such as via control signals issued by the computing device 510, the imager 555 can alternatively receive reflections from the scene in the two wavelengths $\lambda_1$, $\lambda_1$. IR-only retroreflectors can be found in the scene by the computing device 510 identifying pixels that are saturated by reflected by light emitted by the first laser 550 but detect far less or no reflection from light emitted by the second laser 551. For each pixel location where there is saturated pixel from one illumination and little or no intensity from the second illumination source a detection of an IR-only retroreflector may be noted.

LIDAR systems using scanning lasers can also be combined with flash systems as an alternative to the systems described above. A flash imager system can operate at one IR wavelength and a LIDAR system can operate at another IR wavelength in order to uniquely identify IR-only retroreflectors.

A system using two IR sensitive cameras can also be used with various embodiments. The difference between this system and the flash navigation system described above is that a dual camera system will have two imagers. In this embodiment system, two IR illumination wavelengths $\lambda_1$, $\lambda_1$ may be used to alternately illuminate the scene or illumination with both wavelengths can simultaneously illuminate the scene. Each camera contains an imager with an array of photosensitive detectors with a filter that makes each imager sensitive to one but not the other of the two wavelengths $\lambda_1$, $\lambda_1$. The cameras may be aligned, either physically or through software transform of data, such that the output of both cameras can be spatially compared. Both cameras will detect the reflectivity of objects in the environment in essentially the same way except for IR-only retroreflectors. In that case the pixels of received light reflected from the IR-only retroreflector will be saturated as described earlier and the second camera will show little or no reflection from that target. A computing device (e.g., 510) comparing all sensed pixels from own imager with the other can readily detect those pixels that have significant intensity differences. In this way an IR-only retroreflector can be uniquely identified and located in the 3-D space and a detection made. Systems that do not rely on alternating illumination but project simultaneous dual wavelength illuminations have the advantage of doubling the scan rate. A disadvantage is that more hardware is needed.

At least one AV designer is contemplating use of a radar plus a camera system for navigation. Various embodiments disclosed may be used with this type of system as well to provide enhanced and more rapid means of detecting IR-only retroreflectors. Radar cannot identify an IR-only retroreflector so an auxiliary system containing dual laser systems can be used to detect IR-only retroreflectors. Detection may be made as described in the Integrated LIDAR system.

As described above, current AV navigation systems are designed to detect objects designed for human sense and reaction. For example, the meaning of road signs is communicated by their shape, words or symbols, reflectivity and color. But current signs are not optimized for machine reading. Much like barcodes or QR codes cannot be read by a human, such codes are designed to be more reliably, more quickly, read by machine. Enhanced safety on the road suggests that signs, warning symbols on vehicles, and guides should likewise be designed for both human and machine detection.

Figure 11:
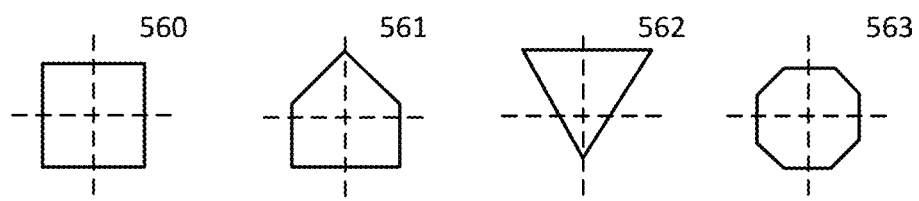
FIG. 11 is a graphic representation of some basic geometric shapes of common roadway signs.

Typical shapes used on roadways and highways are shown in FIG. 11. Their geometries alone may or may not provide specific information. For example, a square shape 560 and is used to convey a large variety of information or warnings, so detecting a square or rectangular geometry does not provide much specificity. School yield signs 561, yield signs 562, and stop signs 563 are more unique. AVs are tasked with detecting and interpreting these signs on the roadway. For example, a school yield sign should alert the AV to be hypervigilant for children crossing the street, and to gradually slow in school crossing areas. The sooner a sign is detected the sooner an AV may adapt to the situation and take an action reduce its threat level. Various embodiments include modifying signs with IR-only taggants on roadways to enhance machine detection and interpretation by AV systems.

Figure 12:
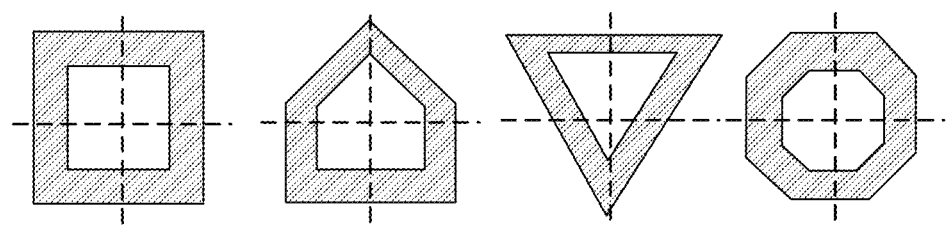
FIG. 12 is a graphic representation of roadside signs enhanced for machine vision identification in accordance with various embodiments.

The use of IR-only retroreflectors has been shown above to provide a very unique taggant for objects of import. However, to the human eye, these materials may appear black. It may not be helpful to use an IR-only retroreflector on signs and symbols that must also be interpreted by the human eye. In some embodiments all geometries for roadways signs and symbols may be enclosed in an outline border of IR-only retroreflector material as shown in FIG. 12, which may significantly enhance vision system detection of roadway signs using IR-only retroreflector material. In some embodiments, the border will be between 3 and 12 inches to increase detectability at greater distances.

Figure 16:
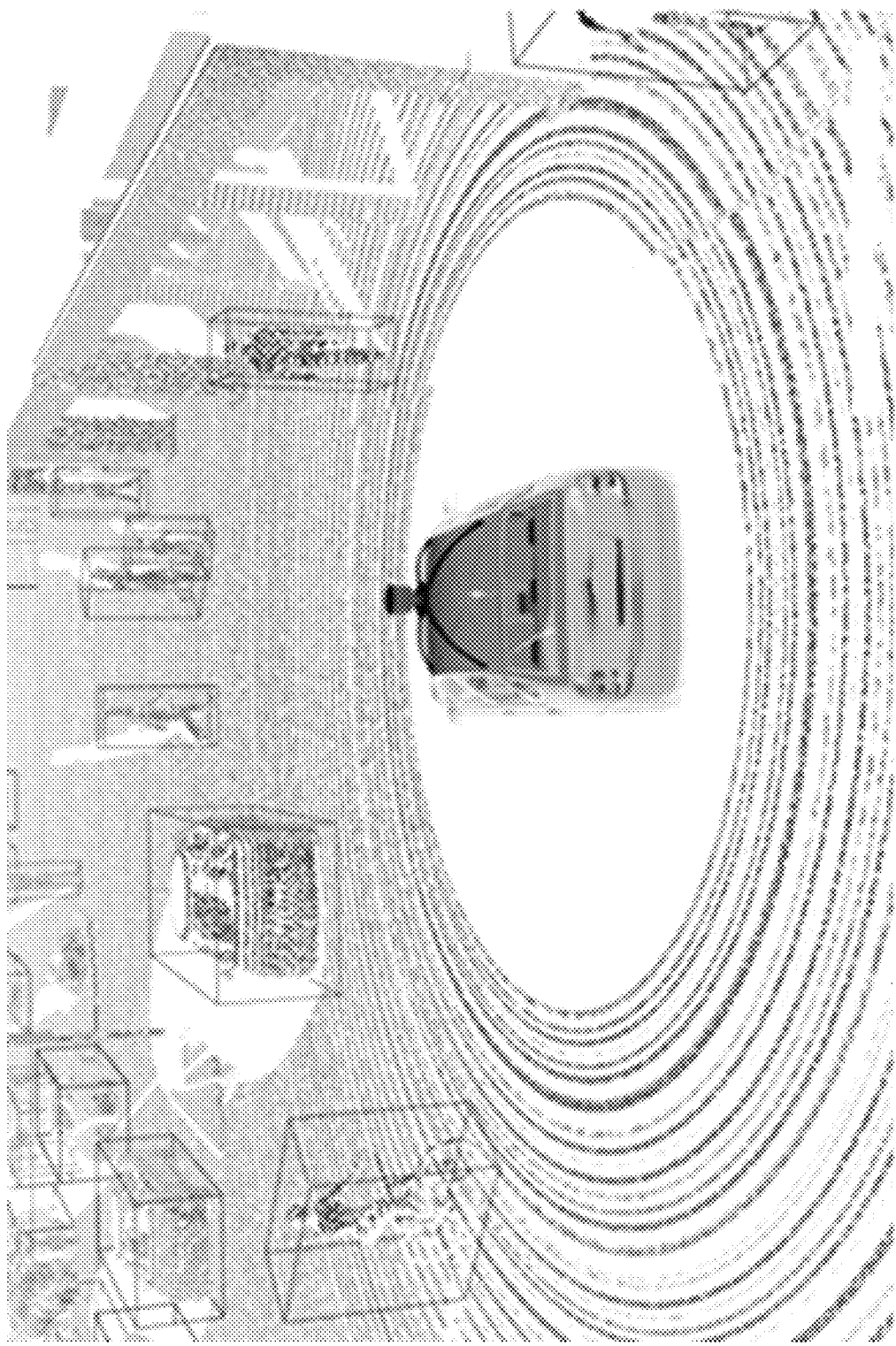
FIG. 16 is a graphical representation of the resolution of a conventional LIDAR system.
Figure 18:
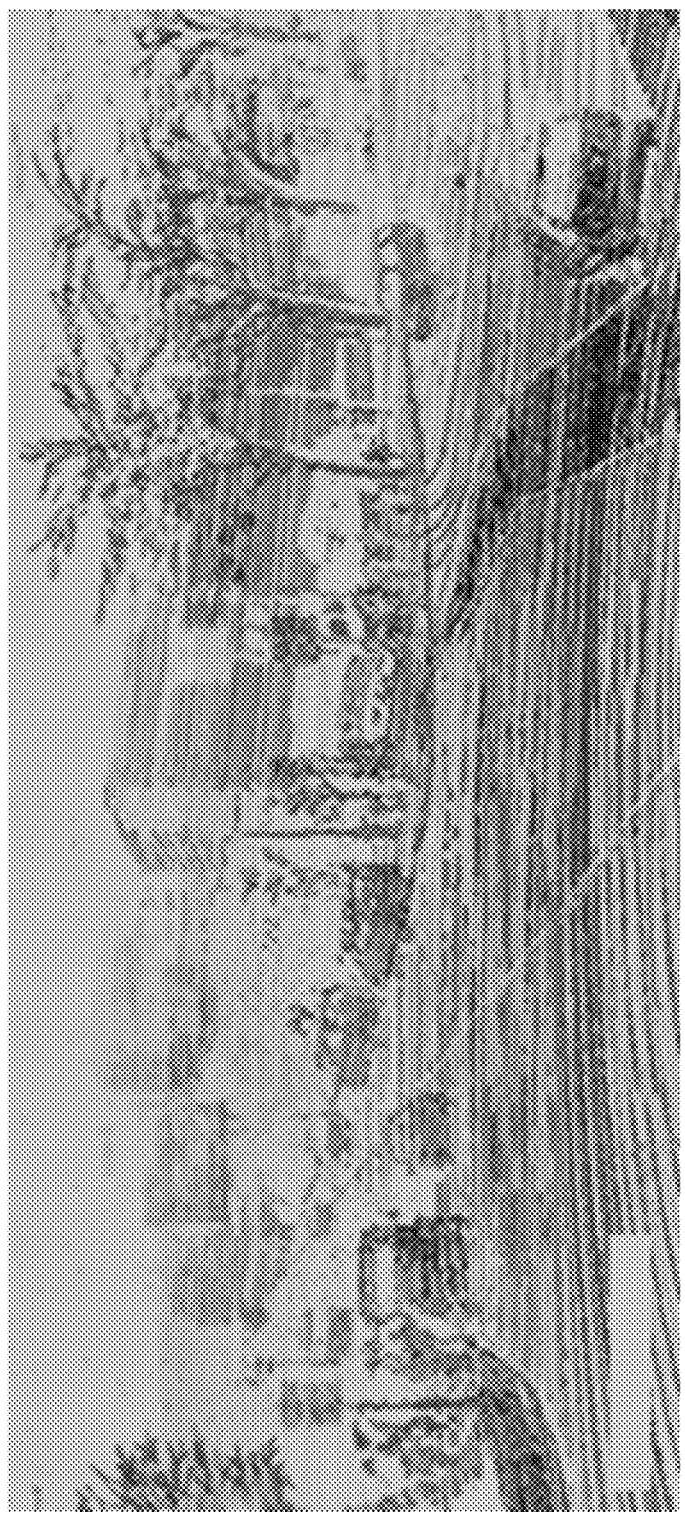
FIG. 18 is a graphical representation of the resolution of a Velodyne® LIDAR system.

The IR-only retroreflector border provides multiple advantages. It being a border necessitates an enlargement of the sign or symbol such that it is a larger object to detect. Secondly, being a border and retaining the geometry provides a means for the machine vision system to identify the sign by its geometry. For example, detecting a pattern of IR-only retroreflectors having the octagon shape of a stop sign provides sufficient data to convey its meaning without the machine vison system having to detect color or interpret letters. Thirdly, the IR-only retroreflector boarder is to be used on only objects of import so fewer objects need to be analyzed, thus speeding detection and increasing attention of the AV navigation system to respond appropriately. Lastly, roadway signs and symbols are occasionally and partially obscured by trees, damage or vandalism, so providing an IR-only retroreflector border on signs may enable a machine vision system to interpret the unique geometry of a sign if only 50% of the geometry is visible. FIGS. 16 and 18 depict the low spatial resolution as a LIDAR system 'sees' its environment. Having signs and symbols with IR-only boarders will significantly enhance their detection in relatively low-resolution detection systems.

Figure 17:
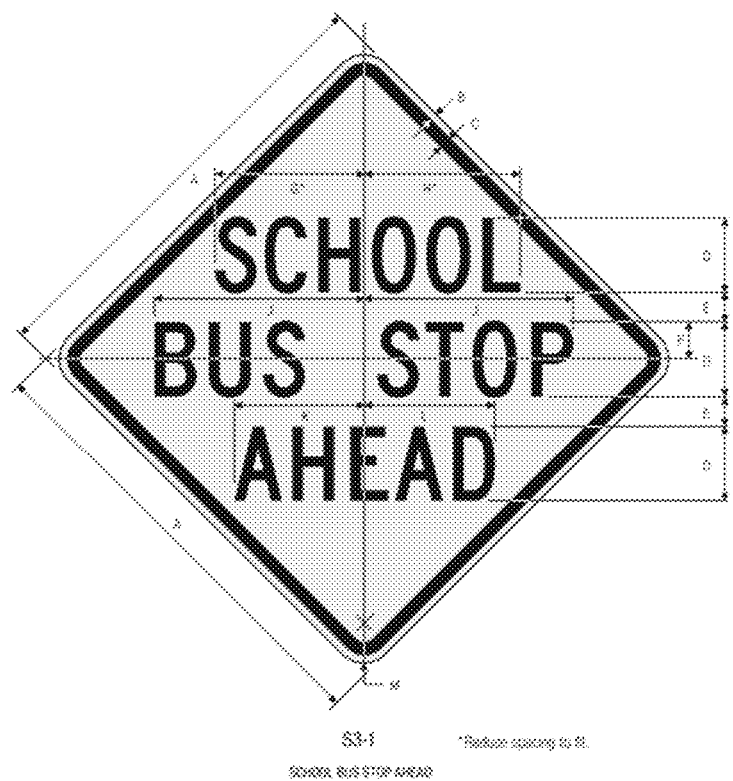
FIG. 17 is a graphical illustration of a traditional shape and standardized size of a school bus stop sign.

An external border of black material is typically included to help identification of a sign as shown in FIG. 17. In some embodiments, providing an external border of IR-only retroreflector material will appear to the human eye as a black border as shown in FIG. 12.

A further advantage of providing an external border of IR-only retrofit material on signs is that the retrofit materials may be disposed on the border in a manner that provides a barcode or QR code that can be read by the scanner system. For example, the retrofit or material may be disposed along the border in stripes having a barcode pattern. Providing a barcode or QR code on road signs may be used to convey information to autonomous vehicles (and similar systems) and a more efficient format than letters. For example, while a stop sign that may include the letters "STOP" to communicate with humans, an IR-only retroreflector barcode may be included in the border to communicate the same meaning to IR scanning systems of autonomous vehicles. IR-only retroreflector barcodes or QR codes may also be used to convey information to IR scanning systems of autonomous vehicles that are not intended for humans to read, as such codes would appear black to the human eye.

As with all detection or safety systems, there should be a very high level of detection accuracy or the system will generate false alarms and be rendered useless. For this reason, an algorithm for calculating a Detection Score (DS) and a Threshold Value (TV) is here provided that may be implemented on a computing system within an AV system or a LIDAR system within an AV. The DS is a determination of detection confidence by summing independent but contributory aspects of a detection. The greater the number of independent assessments made, the greater the confidence that a tagged object has been identified. The TV is used as a threshold comparator below which there is limited confidence that the object is an IR-only retroreflector. If the DS is above the TV then a detection of high confidence has been made. These factors all come from the sensing system and are related to detecting IR-only retroreflectors. If the summation of scores is equal to or greater than the TV score an alert may be sent to the navigation system. If the summation of scores is below the TV, then no alert may be sent.

The TV may also be a variable. That is, in highly congested areas where pedestrians are likely, such as inner-city streets, the TV may be lowered. In other environments where collision or pedestrians are unlikely the TV may be increased. This may be the case on open roads or highways.

DS may be a function of these variables:

$$DS = f(\text{number of contiguous detections} + \text{detection of a geometric shape} + \text{repeated detections})$$

The following is a description of each variable and a possible scoring means. The numerical scoring provided is illustrative, with final values system dependent, but here provided to demonstrate how the DS is calculated and how it is to be compared to the TV.

Number of contiguous IR-only detections is defined as the number of detections that are contiguous in space. There may be multiple groupings of contiguous detections in a scan which would indicate multiple possible threats to the vehicle. The greater the number of contiguous detections the higher the probability of having detected an IR-only retroreflector. Detecting less than 3 contiguous detections is more indicative of noise in the system and will receive a score of 0. Detecting three to about 20 contiguous detections provides increased confidence and might receive a score of 5. A detection of greater than 20 contiguous points provides a high level of confidence and might receive a score of 10.

Geometry shape of contiguous IR-only pixels are analyzed using known machine vision algorithms to determine if they form a geometric pattern. A geometric pattern is one of a type known to be used to promote safe driving such as shown in FIGS. 11 and 12. These may include man-made signs, symbols, or reflectors on the side of emergency vehicles, tractor trailers and the like. Detecting a geometric shape indicates that the object is likely to be manmade and provides additional confidence of being an object of import. If the shape is one of those found in a database of roadway signs then a score of 10 may be given. If less than 50% of the sign is detected, a lower score of 5 may be given.

Repeat detections—navigation systems typically scan the environment ten to twenty times per second. While there are very few naturally occurring or manmade objects that will reflect in a manner as the IR-only retroreflector, it is the sustainability of the detection as the AV approaches the target that provides greater confidence of a positive detection. For each subsequent detection of an object the likelihood of a positive detection increases, for example a score of two sequential detection may be given a 1, two to five sequential detections may be given a score of five, and more than five detections may be given a score of ten.

In this manner, a maximal score of 30 may be achieved. Generally, any score over 15 may be considered to be highly confident that an IR-only object has been detected.

As disclosed above, the use of signs, symbols and reflectors that are modified specifically to be machine readable will significantly enhance confidence in detection. The above DS calculation is here modified with the anticipation that these modified tags will be used in the roadway environment.

$$DS = f(\text{contiguous detections} + \text{geometric shape} + \text{repeated detections} + \text{detection of a unique symbol})$$

Detection of unique symbol—the objective of an IR-only retroreflector is to provide a highly unique and machine detectable taggant. In the future, it is anticipated that to significantly increase the safety of AVs, roadways will have signs modified to be more readily detectable by machine vision as described previously. An example of this is shown in FIG. 12, where the traditional human readable sign is enhanced with a border of IR-only retroreflector material. In some embodiments, the DS calculation additionally may include the detection of a unique symbol. That is for example, the detection of border geometry, or any special symbol such as the universal symbol for roadway worker, or a hospital 'H' symbol, etc. Detecting this unique symbol will significantly add to detection confidence and may be given a score of ten.

Figure 19:
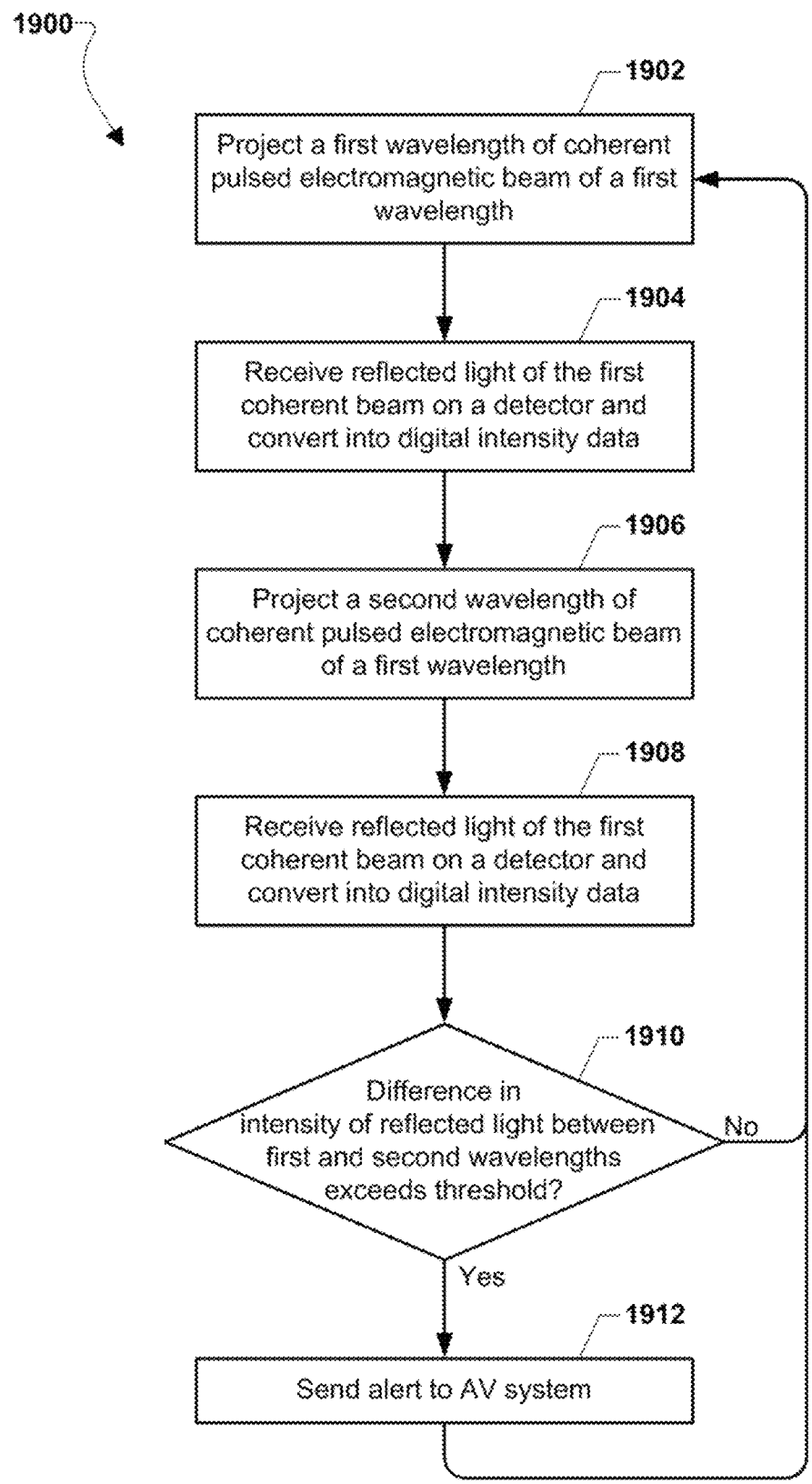
FIG. 19 is a process flow diagram illustrating a method of processing LIDAR scans according to various embodiments.

Some embodiments include methods of photonically detecting an object of high-interest having selective wavelength reflection in the scanned volume. FIG. 19 illustrates an embodiment method 1900, which may be implemented in a scanning system including a computing device (e.g., 510).

The scanning system may sequentially scan the environment by projecting a first wavelength of coherent pulsed electromagnetic beam onto a target in block 1902, and receiving reflected light of the first coherent beam on a photoelectric detector and converting the analog output of the photoelectric detector into digital intensity data in block 1904. The scanning system may sequentially scan the environment by projecting a second wavelength of coherent pulsed electromagnetic radiation onto a target in block 1906, and receiving a reflected wave of the second coherent beam onto a photoelectric detector and converting the analog output of the photoelectric detector into digital intensity data in block 1908. In determination block 1910, a computing device may compare the intensity of the reflected first wavelength light with the intensity of the reflected second wavelength light and determining whether the difference in intensity of the two reflected wavelengths exceeds a threshold. In response to determining that the intensity difference exceeds a threshold (i.e., determination block 1910="Yes"), the computing device may send an alert to an AV system in block 1912. In response to determining that the intensity difference does not exceed the threshold (i.e., determination block 1910="No") or after sending an alert to the AV system in block 1912, the method 1900 may be repeated as the scanning system repeatedly scans the environment.

Figure 20:
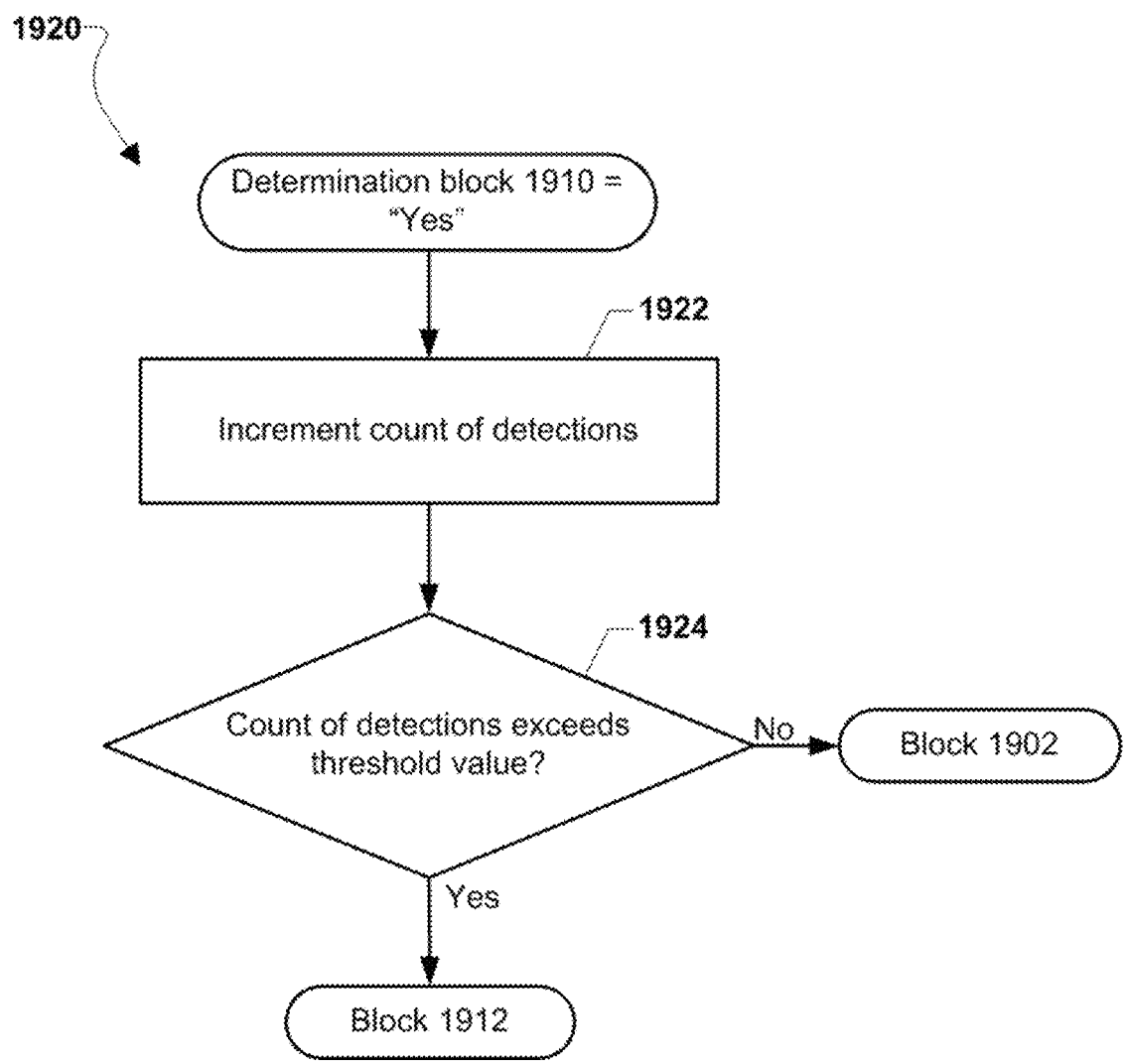
FIG. 20 is process flow diagram illustrating another method of processing LIDAR scans according to some embodiments.

Such embodiment methods may further include determining if multiple spatially contiguous detections are made. As illustrated in FIG. 20, an embodiment method 1920 may further include summing the number of spatially contiguous alerts such as by incrementing a count of detections in each scanning sequence in block 1922 in response to determining that the intensity difference exceeds a threshold (i.e., determination block 1910="Yes"). In determination block 1924, a computing device (e.g., 510) may determining whether the count of detections exceeds a threshold value. In response to determining that the count of detections exceeds the threshold value (i.e., determination block 1924="Yes"), the computing device may send an alert to the AV system in block 1912. Such embodiment methods may further include summing the number of repeated temporal detections of an object in subsequent dual wavelength scans. Some embodiment methods may further include determining a geometric shape or form from detections of contiguous detections such as by comparing detected shapes with geometric shapes of road signs in a database.

The various embodiments may include a computing device 510 that implements operations of various embodiments. Any of a variety of computing devices may be used in various embodiments, an example of which in the form of a system on chip (SOC) 2102 is illustrated in FIG. 21.

Figure 21:
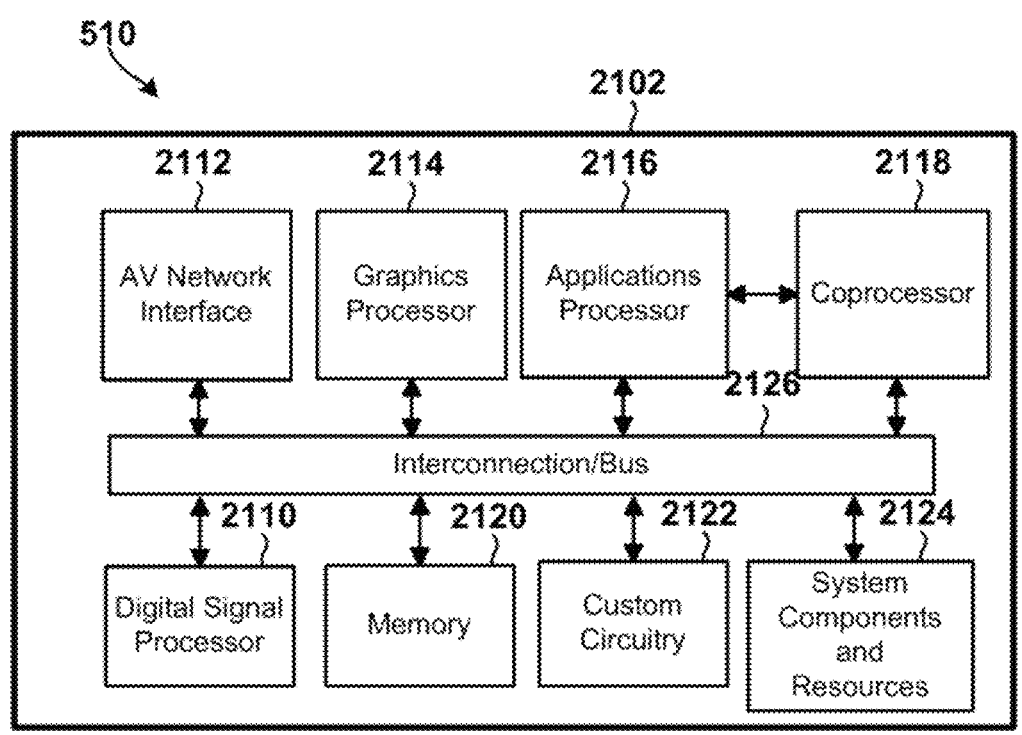
FIG. 21 is a component diagram illustrating an example of a computing device in the form of a system on chip suitable for use in various embodiments.

In the example computing device illustrated in FIG. 21, the computing device SOC 2102 includes a digital signal processor (DSP) 2110, an AV network interface 2112, a graphics processor 2114, an application processor 2116, one or more coprocessors 2118 (e.g., vector co-processor) connected to one or more of the processors, memory 2120, custom circuitry 2122, system components and resources 2124, all interacting via an interconnection/bus module 2126.

Each processor 2110, 2112, 2114, 2116, 2118, may include one or more cores, and each processor/core may perform operations independent of the other processors/cores. One or more of the processors may be configured with processor-executable instructions to perform operations of methods of various embodiments, including methods 1900 and 1920.

Some embodiments include a laser scanning system, which may include a laser source of a first wavelength, a laser source of a second wavelength, a photoelectric detector, an analog to digital converter, a comparator, and a processor coupled to the laser sources, photoelectric detector, an analog to digital converter, wherein the processor is configured with processor-executable instructions to perform operations including sequentially projecting a pulse of a first wavelength and receiving a reflected wave, transferring the intensity data into memory, sequentially projecting a pulse of a second wavelength and receiving a reflected wave and transferring the intensity data into memory, comparing the first intensity with the second, sending an alert if the difference is greater than a threshold value.

In such embodiments, the processor may be further configured with processor-executable instructions to perform operations including determining whether multiple contiguous saturated amplitudes have an essential geometric shape using an image processing algorithm.

Some embodiments include a laser scanning system, which may include means for sequentially scanning the environment by projecting a coherent electromagnetic radiation beam, means for receiving a reflected wave of the beam onto a photoelectric detector, means for converting the analog output of the photoelectric detector into digital data, means for recording each sequential projected beam's angle and azimuth relative to a baseline, means for storing in memory the sequential digital data with its associated angle and azimuth, means for identifying any digital data representing a saturated intensity condition, means for identifying presence of multiple contiguous digital data having a saturated condition, and means for sending an alert if one or more sets of contiguous saturated conditions exceed a predetermined number of contiguous digital data having a saturated condition. Such embodiments may further include means for determining if multiple contiguous saturated intensities have a geometric shape using an image processing algorithm. In some cases, where the average reflected intensity is low and no saturated detections made, the definition of saturated may be defined as being significantly greater than average but below totally saturated level.

Some embodiments include an IR-only retroreflector device for use in tagging objects for recognition by laser scanning systems, which may include a substrate, a reflector having essential characteristics of a retroreflector, a refractive component of the retroreflector having transmissive optical properties above 1100 nm and absorption or scattering characteristic properties below 1100 nm, and a substrate appended to, or part of, an object that may support mobile vehicle guidance. The object may be a roadway sign, a vehicle, or an object associated with a roadway. The object may be configured to assist autonomous vehicles to perform safe navigation. In some embodiments, the IR-only retroreflector material may be configured to include a barcode or QR code form from the IR-only retroreflector material. The barcode or QR code may encode information regarding the object.

Some embodiments include a method of modifying roadway signs to assist in safe navigation of autonomous vehicles, including applying a boarder of IR-only retroreflector material to a roadway sign, the IR-only retroreflector material having essential characteristics of a retroreflector, a refractive component of the retroreflector having transmissive optical properties for wavelengths equal to or larger than 1100 nm and absorption or scattering characteristic properties for wavelengths smaller than 1100 nm. In some embodiments, the IR-only retroreflector material may be configured to include a barcode or QR code form from the IR-only retroreflector material. The barcode or QR code may encode information regarding a meaning of the roadway sign.

Some embodiments include a device having unique spectral reflectance characteristics for use in roadway navigation, which may include a substrate supporting one or more reflectors, a reflector having essential characteristics of a retroreflector, an optical filtering coating on the retroreflector having transmissive optical properties for wavelengths greater than or equal to 1100 nm and absorption or scattering characteristic properties for wavelengths smaller than 1100 nm, and a substrate appended to, or part of, an object that may support mobile vehicle guidance.

Some embodiments include a device having unique spectral reflectance characteristics for use in roadway navigation, which may include a substrate supporting one or more reflectors, a reflector having essential characteristics of a retroreflector, a refractive component of the retroreflector having transmissive optical properties above a predefined wavelength and having absorption or scattering characteristic properties below said wavelength, and a substrate appended to, or part of, an object that may support mobile vehicle guidance.

Some embodiments include a device having unique spectral reflectance characteristics for use in roadway navigation, which may include a substrate supporting one or more reflectors, a reflector having essential characteristics of a retroreflector, an optical filtering coating on the retroreflector having transmissive optical properties for wavelengths greater than a predefined wavelength and having absorption or scattering characteristic properties smaller than said wavelength, and a substrate appended to, or part of, an object that may support mobile vehicle guidance.

Various embodiments provide an enhanced safety system for mobile vehicles, including a device and a unique taggant material, which can significantly improve the safety of AVs and pedestrians. Various embodiments provide redundancy for AV navigation and safety systems by using a unique optical taggant on stationary or moving objects of importance, providing higher sensitivity and recognition that results in faster response time to threats. With various embodiments, a vehicle's navigation system may be alerted sooner to take evasive actions and can be added inexpensively. Further, various embodiments include a means of minimizing false detections and enables an enhancement to roadway objects, such as signs, to be designed to optimize detection by machine vision.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with various embodiments may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of photonically detecting an object of high-interest having selective wavelength reflection in a scanned volume, the method comprising:
    projecting coherent light of a first wavelength;
    receiving reflected light of the first wavelength on a photoelectric detector and outputting a digital measure of intensity of the reflected light of the first wavelength;
    projecting coherent light of a second wavelength different from the first wavelength;
    receiving reflected light of the second wavelength on the photoelectric detector and outputting a digital measure of intensity of the reflected light of the second wavelength;
    determining whether a difference between the intensity of reflected light of the first wavelength and the intensity of reflected light of the second wavelength exceeds an intensity difference threshold for multiple points within a two-dimensional point map of the scanned volume;
    determining a number of the multiple points within the two-dimensional point map that are spatially contiguous to one another that exceed the intensity difference threshold; and
    sending an alert to a control system in response to determining that the number of the multiple points within the two-dimensional point map that are spatially contiguous to one another that exceed the intensity difference threshold exceeds a number threshold.

2. The method of claim 1, wherein the coherent light of the second wavelength is infrared (IR) light equal to or larger than 1100 nm and the coherent light of the first wavelength is smaller than 1100 nm.

3. The method of claim 1, wherein the alert indicates an IR-only retroreflector is detected.

4. The method of claim 1, wherein:
    projecting coherent light of the first wavelength comprises projecting pulses of a first beam of coherent light of the first wavelength;
    projecting coherent light of the second wavelength comprises projecting pulses of a second beam of coherent light of the second wavelength between the pulses of the first beam of coherent light of the first wavelength and spatially coincident with the first beam,
    the method further comprising determining a location within the scanned volume based upon a rotational angle and azimuth of the first and second beams at which the difference between the intensity of reflected light of the first wavelength and the intensity of reflected light of the second wavelength exceeds the intensity difference threshold.

5. The method of claim 1, wherein receiving reflected light of the first and second wavelengths on the photoelectric detector and outputting digital measures of intensity of the reflected light of the first and second wavelengths each comprise receiving reflected light on a pixel array of photoelectric detectors forming the photoelectric detector, wherein each pixel in the pixel array corresponds to a point within the two-dimensional point map.

6. The method of claim 1, wherein sending the alert to a control system comprises informing a vehicle navigation system of detection of an IR-only retroreflector.

7. The method of claim 1, wherein receiving reflected light of the first and second wavelengths on the photoelectric detector comprises receiving reflected light on a single photoelectric detector, wherein the two-dimensional point map of the scanned volume is defined by mapping the single photoelectric detector such that each point within the two-dimensional point map is a discrete location within the scanned volume.

8. The method of claim 1, wherein the receipt of the reflected light of one of the first and second wavelengths saturates multiple points within the two-dimensional point map of the scanned volume and the receipt of the reflected light of the other one of the first and second wavelengths does not saturate the multiple points within the two-dimensional point map of the scanned volume.

9. The method of claim 1, further comprising:
summing a number of repeated temporally consecutive determinations of whether the difference between the intensity of reflected light of the first wavelength and the intensity of reflected light of the second wavelength exceeds the intensity difference threshold, wherein sending the alert to the control system is further in response to determining that the number of repeated temporally consecutive determinations exceeds a consecutive scan threshold.

10. The method of claim 1, further comprising:
determining whether a first geometric shape formed by the multiple points within the two-dimensional point map matches a second geometric shape stored in a database, wherein sending the alert to the control system is further in response to determining that the first geometric shape matches the second geometric shape.

11. The method of claim 1, further comprising determining whether a barcode or QR code pattern is formed within the scanned volume, wherein sending the alert to the control system is further in response to determining the barcode or QR code pattern is formed within the scanned volume.

12. The method of claim 11, wherein determining that the barcode or QR code pattern is formed within the scanned volume comprises repeatedly scanning the volume and detecting the barcode or QR code pattern in more than one of the scans.

13. The method of claim 1, further comprising:
repeating cycles of the projection of coherent light of the first and second wavelengths, the receipt of reflected light of the first and second wavelengths respectively, and the determination whether a difference between the intensity of the reflected light of the first wavelength and the intensity of reflected light of the second wavelength exceeds an intensity difference threshold for multiple points within a two-dimensional point map of the scanned volume,
wherein sending the alert to the control system is further in response to a consecutive scan threshold of repeated cycles exceeding the number threshold.

14. A laser scanning system for use in a vehicle, comprising:
a first laser configured to emit coherent light of a first wavelength;
a second laser configured to emit coherent light of a second wavelength different from the first wavelength;
a photoelectric detector configured to determine an intensity of reflected light in a scanned volume thereof; and
a computing device coupled to the first and second lasers and the photoelectric detector, wherein the computing device is configured with processor-executable instructions to perform operations comprising:
causing the first laser to project light of the first wavelength and receiving a measure of intensity of reflected light of the first wavelength from the photoelectric detector;
causing the second laser to project light of the second wavelength and receiving a measure of intensity of reflected light of the second wavelength from the photoelectric detector;
determining whether a difference between the intensity of reflected light of the first wavelength and the intensity of reflected light of the second wavelength exceeds an intensity difference threshold for multiple points within a two-dimensional point map of the scanned volume;
determining a number of the multiple points within the two-dimensional point map that are spatially contiguous to one another that exceed the intensity difference threshold; and
sending an alert to a control system in response to determining that the number of the multiple points within the two-dimensional point map that are spatially contiguous to one another exceeds a number threshold.

15. The laser scanning system of claim 14, wherein the coherent light of the second wavelength is infrared (IR) light equal to or larger than 1100 nm and the coherent light of the first wavelength is smaller than 1100 nm.

16. The laser scanning system of claim 14, the computing device is configured with processor-executable instructions to perform operations such that the alert indicates an IR-only retroreflector is detected.

17. The laser scanning system of claim 14, further comprising a laser positioning system coupled to the first and second laser and the computing device and configured to orient the first and second laser to rotation angle and azimuth coordinates and convey the rotation angle and azimuth coordinates to the computing device, wherein the computing device is configured with processor-executable instructions to perform operations further comprising determining a location within the scanned volume based upon a rotational angle and azimuth of the first and second beams at which the difference between the intensity of reflected light of the first wavelength and the intensity of reflected light of the second wavelength exceeds the intensity difference threshold.

18. The laser scanning system of claim 14, wherein the photoelectric detector comprises a pixel array of photoelectric detectors, wherein each pixel in the pixel array corresponds to a point within the two-dimensional point map.

19. The laser scanning system of claim 14, wherein the computing device is configured with processor-executable instructions to perform operations such that sending the alert to a control system comprises informing a vehicle navigation system of detection of an IR-only retroreflector.

20. The laser scanning system of claim 14, wherein the computing device is configured with processor-executable instructions to perform operations such that receiving reflected light of the first and second wavelengths on the photoelectric detector comprises receiving reflected light on a single photoelectric detector, wherein the two-dimensional point map of the scanned volume is defined by mapping the single photoelectric detector such that each point within the two-dimensional point map is a discrete location within the scanned volume.

21. The laser scanning system of claim 14, wherein the computing device is configured with processor-executable instructions to perform operations such that the receipt of the reflected light of one of the first and second wavelengths saturates multiple points within the two-dimensional point map of the scanned volume and the receipt of the reflected light of the other one of the first and second wavelengths does not saturate the multiple points within the two-dimensional point map of the scanned volume.

22. The laser scanning system of claim 14, wherein the computing device is configured with processor-executable instructions to perform operations further comprising summing a number of repeated temporally consecutive determinations of whether the difference between the intensity of reflected light of the first wavelength and the intensity of reflected light of the second wavelength exceeds the intensity difference threshold, wherein sending the alert to the control system is further in response to determining that the number of repeated temporally consecutive determinations exceeds a consecutive scan threshold.

23. The laser scanning system of claim 14, wherein the computing device is configured with processor-executable instructions to perform operations further comprising determining whether a first geometric shape formed by the multiple points within the two-dimensional point map matches a second geometric shape stored in a database, wherein sending the alert to the control system is further in response to determining that the first geometric shape matches the second geometric shape.

24. The laser scanning system of claim 14, wherein the computing device is configured with processor-executable instructions to perform operations further comprising determining whether a barcode or QR code pattern is formed by the multiple points within the two-dimensional point map, wherein sending the alert to the control system is further in response to determining the barcode or QR code pattern is formed by the multiple points within the two-dimensional point map.

25. The laser scanning system of claim 24, wherein determining that the barcode or QR code pattern is formed within the scanned volume comprises repeatedly scanning the volume and detecting the barcode or QR code pattern in more than one of the scans.

26. The laser scanning system of claim 14, wherein the computing device is configured with processor-executable instructions to perform further operations comprising:

repeating cycles of causing the projection of coherent light of the first and second wavelengths, the receipt of the measure of reflected light of the first and second wavelengths respectively, and the determination whether a difference between the intensity of the reflected light of the first wavelength and the intensity of reflected light of the second wavelength exceeds an intensity difference threshold for multiple points within a two-dimensional point map of the scanned volume, wherein sending the alert to the control system is further in response to a consecutive scan threshold of repeated cycles exceeding the number threshold.

* * * * *